US006986489B2

(12) United States Patent
Oddsen, Jr.

(10) Patent No.: US 6,986,489 B2
(45) Date of Patent: Jan. 17, 2006

(54) CONFIGURABLE MOUNT FOR A PERIPHERAL DEVICE

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 09/884,540

(22) Filed: Jun. 19, 2001

(65) Prior Publication Data
US 2002/0190172 A1 Dec. 19, 2002

(51) Int. Cl.
A47F 5/00 (2006.01)
(52) U.S. Cl. ............... 248/289.11; 248/316.6; 248/230.5; 248/316.1; 248/231.61; 403/403; 211/64
(58) Field of Classification Search ............ 248/228.5, 248/230.5, 231.61, 540, 316.6, 229.2, 316.1, 248/229.24, 229.25, 228.6, 231.71; 24/243; 211/64, 86.01; 403/403, 13, 14, 4, 381, 382
See application file for complete search history.

(56) References Cited

U.S. PATENT DOCUMENTS

| 632,999 A | 9/1899 | Grant ................... 248/314 |
| 931,437 A | 8/1909 | Larson .................. 248/314 |
| 1,764,071 A | 6/1930 | Foulke ................. 248/231.7 |
| 1,785,518 A | 12/1930 | Higgins ................. 248/314 |
| 1,840,216 A * | 1/1932 | Tormo ..................... 248/72 |
| 2,062,156 A * | 11/1936 | Zerbst .................. 248/488 |
| 2,148,307 A * | 2/1939 | Scott .................... 311/103 |
| 2,628,051 A | 2/1953 | Anderson ............. 248/231.7 |
| 2,756,954 A | 7/1956 | Whitlow ................ 248/314 |
| 2,961,209 A | 11/1960 | Willey .................. 248/231.7 |
| 3,131,900 A | 5/1964 | Anderson et al. .......... 248/210 |
| 3,424,419 A | 1/1969 | Siegel .................. 248/226 |
| 3,489,383 A | 1/1970 | Anson .................. 248/226 |
| 3,591,118 A | 7/1971 | Gentile et al. ............ 248/226 |
| 3,929,309 A * | 12/1975 | Devore .................. 248/118 |
| 4,687,167 A | 8/1987 | Skalka et al. ............. 248/282 |
| 4,703,909 A | 11/1987 | Dayton et al. ........... 248/280.1 |
| 4,911,348 A * | 3/1990 | Rasor et al. ............ 224/321 |
| 5,201,896 A | 4/1993 | Kruszewski .............. 248/278 |
| 5,277,392 A | 1/1994 | Rossman et al. ......... 248/231.7 |
| 5,370,570 A * | 12/1994 | Harris .................. 446/227 |
| 5,615,854 A | 4/1997 | Nomura et al. .......... 248/287.1 |
| 5,642,819 A | 7/1997 | Ronia .................. 211/86.01 |
| 5,664,750 A | 9/1997 | Cohen .................. 248/231.71 |
| 5,706,832 A * | 1/1998 | Gold ................... 131/240.1 |
| 5,765,794 A | 6/1998 | Chen .................... 248/292.12 |
| 5,941,493 A | 8/1999 | Cheng .................. 248/371 |
| 6,192,645 B1 * | 2/2001 | Benz et al. ............. 52/656.1 |
| 6,550,875 B1 * | 4/2003 | Compton et al. .......... 312/196 |

FOREIGN PATENT DOCUMENTS

WO          WO 00/25640          5/2000

* cited by examiner

Primary Examiner—Kimberly T. Wood
(74) Attorney, Agent, or Firm—Lerner, David, Littenberg, Krumholz & Mentlik, LLP

(57) ABSTRACT

Mounting system for mounting an adjustable arm for a peripheral device. The system includes a set of components which may be configured to create a clamp mount, a wall mount, a reverse wall mount, or table or flat mount, a panel mount and a slat mount. The components include a shaft holder for receiving the shaft of the arm apparatus and a pair of L-shaped brackets. One of the brackets includes a pair of extending pins which are received within openings within the other flange when assembling the components.

49 Claims, 22 Drawing Sheets

CONFIGURABLE MOUNT FOR A PERIPHERAL DEVICE

BACKGROUND OF THE INVENTION

The present invention relates to apparatuses and systems for mounting an adjustable arm for a peripheral device such as a computer display screen, a keyboard, a telephone or the like.

There are mounting systems known in the art for a variety of products. For example, Siegel, U.S. Pat. No. 3,424,419 discloses a C-shaped mounting bracket supporting a pivotable ball supporting device to which there is mounted a mannequin head. A similar mounting device is disclosed in Anson, U.S. Pat. No. 3,489,383. Cohen, U.S. Pat. No. 5,664,750 discloses a C-shaped camera mount supporting an adapter to which there is mounted an elongated pole. Rossman, et al., U.S. Pat. No. 5,277,392 discloses a C-shaped mount to which there is attached a shaft holder for rotationally mounting an arm supporting a table for a monitor. Gentile, U.S. Pat. No. 3,591,118 discloses a C-shaped mount supporting a hollow shaft to which there is mounted a mannequin head. Higgins, U.S. Pat. No. 1,785,518 discloses an iron cord mounting device attachable to an ironing board. A hollow cord holder is mounted above a bracket by a ball supported extension. Foulke, U.S. Pat. No. 1,764,071 discloses a roof peak or chimney mountable bracket for a radio antenna. Willey, U.S. Pat. No. 2,961,209 and Whitlow, U.S. Pat. No. 2,756,954 each disclose a fishing rod holder mountable to a support. Notwithstanding the existence of the foregoing mounting brackets, there remains the need for improvements in a configurable mount for peripheral devices such as electronic devices and the like.

SUMMARY OF THE INVENTION

Apparatuses and configurable mounting systems for mounting an arm device are disclosed. Arm devices are disclosed in co-pending (1) application Ser. No. 09/776,355, entitled "Arm Apparatus For Mounting Electronic Devices With Cable Management System," filed on Feb. 2, 2001, (2) application Ser. No. 09/405,628, entitled "Arm Apparatus For Mounting Electronic Devices, filed Sep. 24, 1999, (3) application Ser. No. 09/474,936, entitled "Arm Apparatus For Mounting Electronic Devices, and Method of Making and Using the Same, filed Dec. 30, 1999, and (4) application Ser. No. 09/406,006, entitled "Arm Apparatus For Mounting Electronic Devices With Cable Management System," filed on Sep. 24, 1999, the disclosures of which are incorporated herein by reference. The arm device may be attached to a peripheral device, which may be an electronic device such as a computer display screen, a keyboard, television, a telephone or the like.

The systems include a set of components which may be configured to create apparatuses including a clamp mount, a wall mount, a reverse wall mount, or table or flat mount. In addition, the systems may include components which may be configured to create a panel mount and a slat wall mount. The mounting systems have many benefits and advantages to the consumer, distributor and manufacturer. The consumer obtains more than one different mounting option for the price of a single mount. Previously, the consumer was required to choose the type of mount which she desired at the time of purchase of the arm. The systems also provide flexibility of providing a different mounting configuration in the future, if the consumer decides to move the arm or reconfigure the mount. A distributor of the mounting systems benefits by being relieved from maintaining an inventory of each of the different types of mounts. Also, the mounting systems may be efficiently packaged since the component elements are preferably no wider than the width of a typical arm apparatus. There are several advantages to the manufacturer including a decrease in inventory costs similar to that of the distributor, a lowering of the piece price of the mount since components of the systems may be used in a number of configurations and distinct castings are not required for each type of mount, and a decrease in labor costs since the consumer completes final assembly in the configuration she desires.

The components of the mounting systems include a shaft holder for receiving the shaft of the arm device, a long "L" member, and short "L" member supporting projecting pins, a clamping plate, and clamping screw. In a preferred embodiment, these components are used in conjunction with standard hardware including a long bolt with a hex head, a short screw, a pair of screws having flat tapered countersunk heads, a pair of wall screws, and a single nut. With these components and hardware, at least four of the above-noted mounting configurations may be achieved by the mounting systems of the present invention.

In another aspect, the configurable mount invention additionally comprises adapter brackets that are used to secure the mount to conventional office panel systems and both single and dual slot wall systems.

In accordance with one embodiment of the present invention there is described an apparatus for mounting a device to a supporting surface, the apparatus comprising a shaft holder including a bottom wall formed therein and an open top forming a receptacle therein for removably receiving the device; a first member having a first flange and a second flange perpendicularly attached to the first flange, the first flange attachable to the bottom wall of the shaft holder and the second flange having at least one opening therein; and a second member having a third flange and a fourth flange perpendicularly attached to the third flange, the third flange having an outer wall provided with at least one extending pin receivable within the opening in the second flange when the third flange is supported on the second flange.

In accordance with another embodiment of the present invention there is described an apparatus for mounting an arm device to a supporting surface, the apparatus comprising a shaft holder including a bottom wall formed therein and an open top forming a receptacle therein for receiving the arm device; a first member having a first flange and a second flange perpendicularly attached to the first flange, the first flange attachable to the bottom wall of the shaft holder and the second flange having a pair of spaced openings therein; and a second member having a third flange and a fourth flange perpendicularly attached to the third flange, the third flange having an outer wall provided with a pair of extending pins receivable within the openings in the second flange when the third flange is supported on the second flange and the fourth flange having an outer wall provided with a pair of extending pins receivable within the openings in the second flange when the fourth flange is supported on the second flange, the second flange of the first member including a first opening and the third flange and the fourth flange of the second member include respective second and third openings, the second opening alignable with the first opening when the third flange is supported on the second flange and the third opening alignable with the first opening when the fourth flange is supported on the second flange.

In accordance with another embodiment of the present invention there is described a method of mounting an apparatus for a device to a supporting surface, the method comprising providing a first member having a first flange and a second flange perpendicularly attached to the first flange, the second flange having at least one opening therein; attaching a shaft holder to the first flange for mounting a device thereto; providing a second member having a third flange and a fourth flange perpendicularly attached to the third flange, the third flange having an outer wall and at least one pin extending therefrom; inserting the pin into the opening with the third flange abutting the second flange, the first and fourth flanges forming an opening therebetween; securing the second and third flanges together; and securing a supporting surface within the opening formed between the first and fourth flanges.

In accordance with another embodiment of the present invention there is described a method of assembling an apparatus for attaching a device to a supporting surface, the method comprising providing a first member having a first flange and a second flange perpendicularly attached to the first flange, the second flange having a pair of spaced openings therein; attaching a shaft holder to the first flange for mounting a device thereto; providing a second member having a third flange and a fourth flange perpendicularly attached to the third flange, the third flange having an outer wall and a first pair of pins extending therefrom, the fourth flange having an outer wall and a second pair of pins extending therefrom; inserting either the first pair of pins into the pair of spaced openings with the third flange abutting the second flange or the second pair of pins into the pair of spaced openings with the fourth flange abutting the second flange; and securing the abutting flanges together.

BRIEF DESCRIPTION OF THE DRAWINGS

The accompanying drawings, which are incorporated in and form a part of the specification, illustrate the embodiments of the present invention and, together with the description serve to explain the principles of the invention.

DETAILED DESCRIPTION

Figure 1:
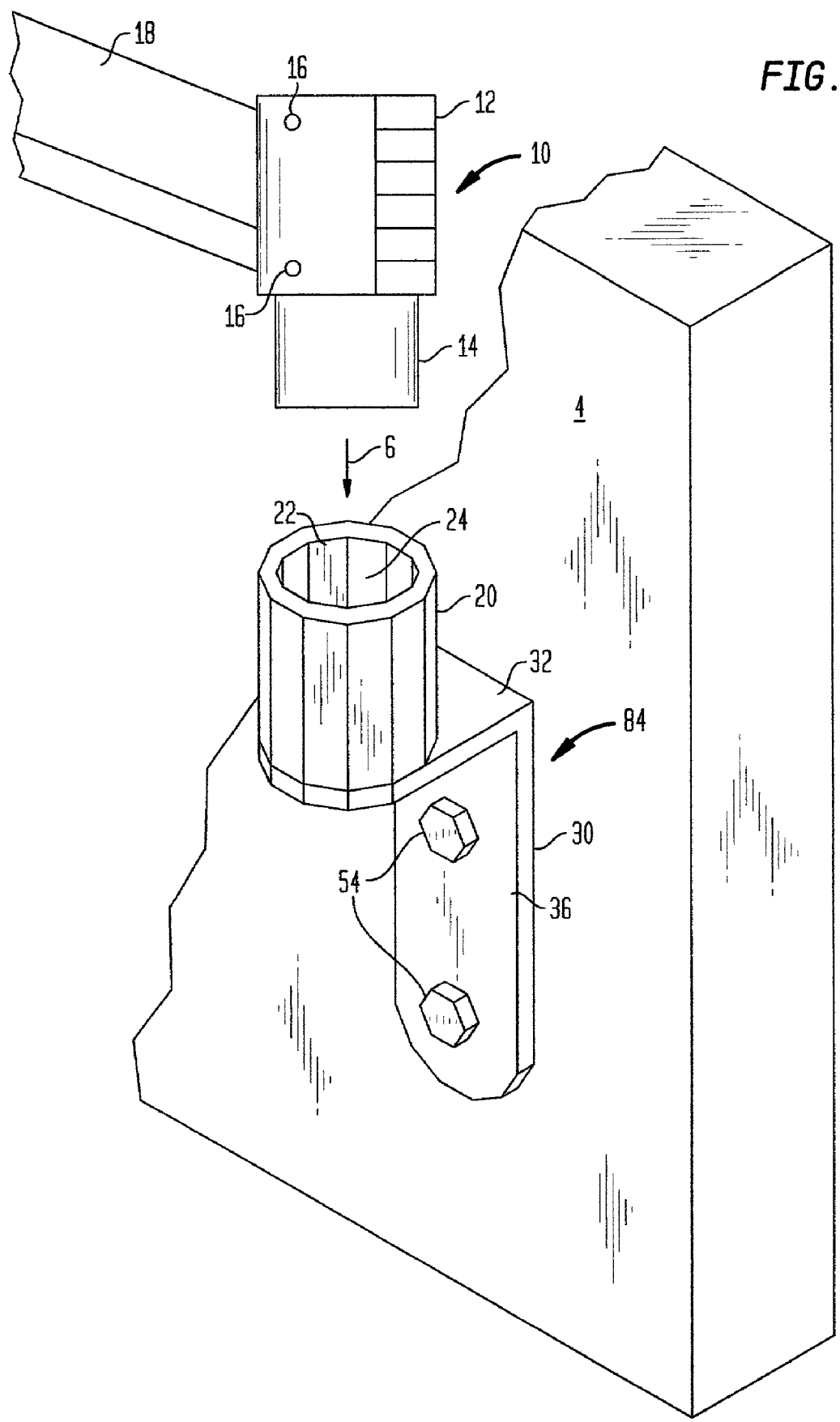
FIG. 1 is a perspective view of an apparatus according to the present invention in a reverse wall mount configuration and the orientation of the arm device to the mount.
Figure 2:
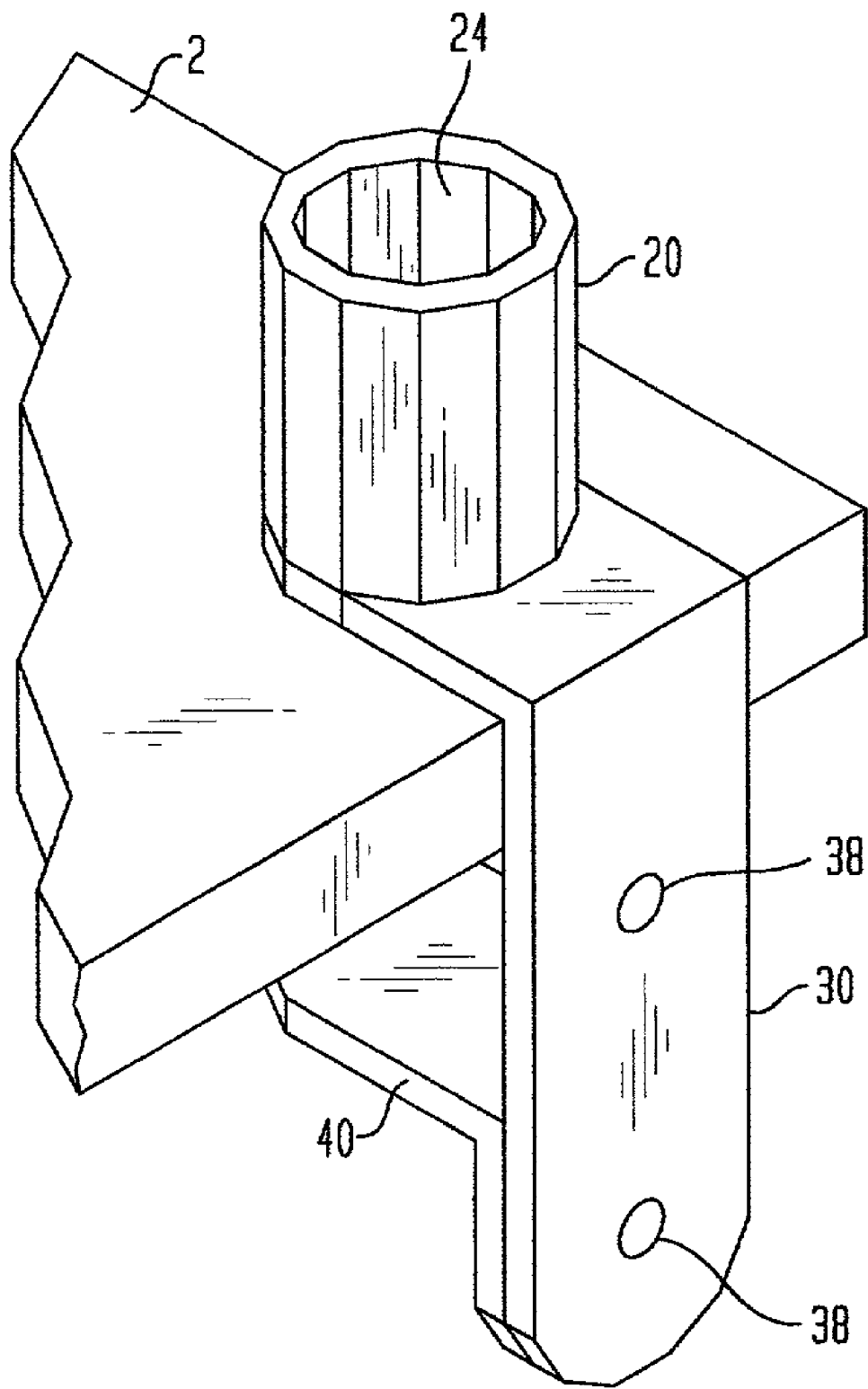
FIG. 2 is a perspective view of an apparatus according to the present invention in a clamp configuration mounted to a table top.

In describing a preferred embodiment of the invention illustrated in the drawings, in which like numerals represent like parts, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 28 in particular, the apparatuses and systems of the present invention are disclosed.

Reference is made to FIGS. 1, 3, 5, 7, 9, 10A and 10B which illustrate mounting apparatuses 84, 82, 80, 86 for mounting a device 10 having an arm 18 on a surface 2, 4. Each apparatus includes a shaft holder 20 that has plurality of walls 22. It is anticipated that the plurality of walls 22 in the preferred embodiment will merge to embody a shaft holder 20 that is circular, e.g., having a smooth inner wall surface. The walls 22 define a receptacle 24 having an enclosed bottom 26 and an opened top portion. The receptacle 24 is shaped to receive an arm device 10 having a cylindrical shaft 14. The shaft 14 of the arm device 10 may be removably inserted in receptacle 24 through the opened top portion as indicated by arrow 6, in which it may freely rotate.

In one embodiment (not shown), a washer may be placed in the bottom 26 of the receptacle 24 to create a more secure fit between the shaft 14 and the receptacle 24. Preferably, the washer is made of plastic. In yet another embodiment (not shown), a bushing can be included on the interior sides of the walls 22 of the receptacle 24 to create less friction and a more secure fit between the shaft 14 and the receptacle 24.

The mounting apparatuses of the current invention each include an attachment device to attach the shaft holder 20 to a surface. A wide variety of attachment devices may be employed to attach the shaft holder 20 to a surface. The preferred attachment device, along with alternative attachment means, are subsequently described.

In preferred embodiments, the apparatuses further comprise a cylindrical threaded rod and a nut 60. The bottom 26 further comprises a hole 28 for receiving the rod. The shaft holder 20 is attached to a long "L" member 30 or to a surface 2, 4 by passing the cylindrical threaded rod through the bottom 26 hole and through the long "L" member 30 or the surface 2, 4, and securing the nut 60 to the rod. When the shaft holder 20 is attached to a long "L" member 30, the long "L" member 30 in turn is attached to a surface 2, 4.

FIGS. 1, 6, 7, 10A, 10B, and 12A through 12C show the mounting system of the present invention configured as a reverse wall mount apparatus 84 having a long "L" member 30. The long "L" member 30 has a first flange 32 and a second flange 36 that are generally perpendicularly attached to one another. First flange 32 has an "a" side 33 and a "b" side 34. The "a" side 33 is the side of first flange 32 that is facing second flange 36. The "b" side 34 is opposite the "a" side 33 of first flange 32.

Long "L" member 30 is secured by at least one wall screw 54 threaded through at least one threaded hole 38 in second flange 36, and into wall 4. Preferably, second flange 36 contains two threaded holes 38, arranged vertically to each other, and the long "L" member is secured by two wall screws 54. In a preferred embodiment, the wall screws 54 are made of wood, and they are secured to a stud in wall 4. Alternatively, any type of threaded cylindrical rod may be used in place of the at least one wall screw 54, provided the rod is of sufficient strength to hold the apparatus 84 to the wall 4.

In this embodiment, the shaft holder 20 is secured to the "b" side 34 of first flange 32 of long "L" member 30 by screw 56, having a flat tapered countersunk head, and nut 60.

Preferably, screw 56 is ⅜-16×1 inch long. Screw 56 passes through hole 35 of first flange 32 and hole 28 of bottom 26 of shaft holder 20. The head of screw 56 may be received by a recess in the hole 35 on the "a" side of first flange 32. Preferably, bottom 26 has a recess 29 adapted to receive the nut 60.

With reference to FIGS. 2, 3, 10A through 13C, the mounting system configured as a clamp mount apparatus 82 is shown. Shaft holder 20 is secured to "b" side 34 of first flange 32 of long "L" member 30 by screw 56 and nut 60. In a preferred embodiment, screw 56 has a flat tapered countersunk head and dimensions of ⅜-16×1 inch long. Hole 35 on the "a" side 33 of first flange 32 has a recess to receive the tapered head of screw 56. The tapered head of screw 56 is adapted to be secured in a countersunk manner in hole 35 such that a flat surface is obtained on "a" side 33 of first flange 32. Screw 56 extends through hole 28 through the bottom 26 of shaft holder 20. A hex nut 60 is secured to screw 56.

Preferably, bottom 26 of shaft holder 20 has a recess 29 adapted to receive the nut 60 which facilitates in the securing of nut 60. Second flange 36 of long "L" member 30 has at least one threaded hole 38. In a preferred embodiment, second flange 36 has two threaded holes 38.

Short "L" member 40 having first flange 42 and second flange 44 in a general perpendicular orientation to each other is attached to the second hole 38 which is the farthest from first flange 32 of long "L" member 30 by screw 58. First flange 42 has a threaded hole 43, and second flange 44 has a recessed hole 45. Preferably, screw 58 has a flat tapered countersunk head and dimensions of ⅜-16×½ inch long. Screw 58 extends through hole 45 of flange 44 into the lower threaded hole in second flange 36 such that the head of screw 58 is countersunk relative to face 46.

It is to be understood however, that any type of threaded cylindrical rod may be used in place of screw 58, provided the rod is of sufficient strength to hold the short "L" member 40 to the long "L" member 30.

First flange 42 of short "L" member 40 has a threaded hole 43 for receiving clamping screw 52 which is screwed through hole 43 and meets hole 51 of clamping plate 50. Preferably, clamping screw 52 is ½-13×3 inches long, and the end of clamping screw 52 is adapted to receive a hex head wrench which is used to tighten the clamp.

Hole 43 is generally centered below hole 35 of first flange 32 of long "L" member 30. The mount is secured to a projecting work surface such as a table top by clamping the surface 2 between "a" side 33 of first flange 32 of long "L" member 30 and the top surface of clamping plate 50. In a preferred embodiment, the clamping plate 50 is made of steel, is circular, and has a 2 inch diameter. A hole 51 is located in the center of clamping plate 50.

In other embodiments (not shown), at least one buffering pad may be placed between "a" side of first flange 32 and the surface 2. In addition, the at least one buffering pad may be alternatively or additionally placed between the top of clamping plate 50 and the surface 2. The buffering pad is shaped similarly to clamping plate 50, having a 2 inch diameter and including a center hole. The buffering pad can protect the surface from abrasion from the apparatus 82. In addition, the buffering pad can create a more secure contact between the apparatus 82 and the surface. While any non-abrasive material could be used to make the buffering pad, a preferred material is neoprene foam. Additionally, the buffering pad may contain an adhesive for adhering to the pad to the "a" side of first flange 32 or to the clamping plate 50.

Figure 18:
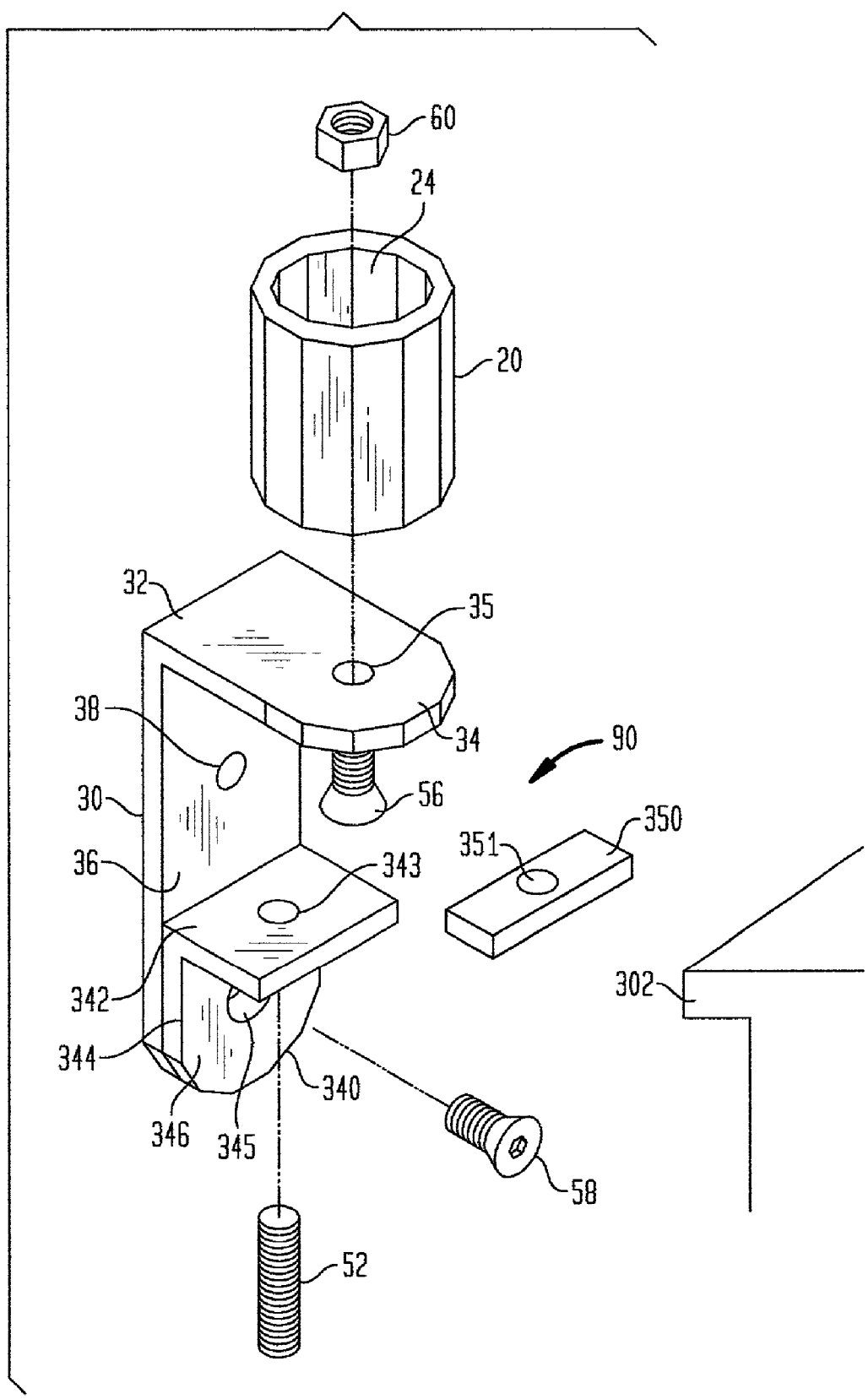
FIG. 18 is an exploded perspective view of a narrow clamp configuration of the present invention.
Figure 19:
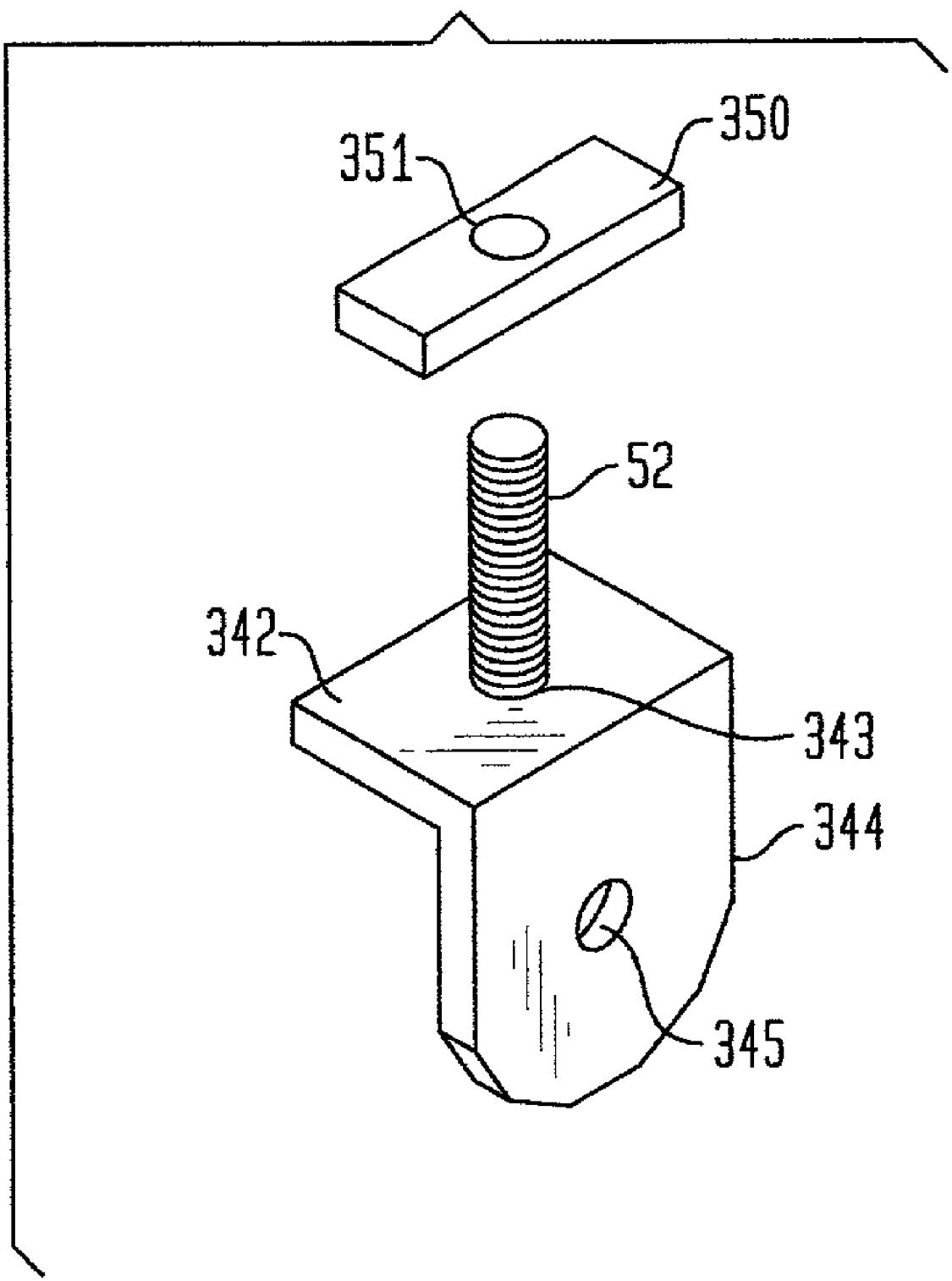
FIG. 19 is an exploded perspective view of the narrow short "L" member and the narrow clamping plate of the present invention.

FIGS. 18 and 19 show the mounting system of the present invention configured as a narrow clamp mount apparatus 90. The narrow clamp mount 90 is similar to the clamp mount 82. Narrow clamp mount 90 utilizes the long "L" member 30 and shaft holder 20 utilized in clamp mount 82. In addition, narrow clamp mount 90 attaches the long "L" member 30 to the shaft holder 20 in the same manner in which they are attached for the clamp mount 82.

The narrow clamp mount 90, however, is adapted to be clamped onto a narrow projecting surface 302, on which the top surface of the projection is deeper than the bottom surface of the projection. A desk having legs or sides is an example of a narrow projecting surface. The narrow clamp mount 90 can be used on a narrow projecting surface 302 that is narrower than the width of the first flange 42 of the short "L" member 40 of clamp mount 82. To fit on the narrow projecting surface 302, first flange 342 of narrow short "L" member 340 is narrower than first flange 42 of short "L" member 40. In addition, a clamping plate is used that is narrower than clamping plate 50. The narrow clamping plate 350 is at least as narrow as first flange 342 of narrow short "L" member 340. Preferably, the narrow clamping plate 350 is in the form of a rectangular clamping bar that has a centered hole 351.

In this embodiment, narrow short "L" member 340 having first flange 342 and second flange 344 in a general perpendicular orientation to each other is attached to the second hole 38 which is the farthest from first flange 32 of long "L" member 30 by screw 58. First flange 342 has a threaded hole 343, and second flange 344 has a recessed hole 345. Preferably, screw 58 has a flat tapered countersunk head and dimensions of ⅜-16×½ inch long. Screw 58 extends through hole 345 of flange 344 into the lower threaded hole in second flange 36 such that the head of screw 58 is countersunk relative to face 346.

It is to be understood however, that any type of threaded cylindrical rod may be used in place of screw 58, provided the rod is of sufficient strength to hold the narrow short "L" member 340 to the long "L" member 30.

First flange 342 of narrow short "L" member 340 has a threaded hole 343 for receiving clamping screw 52 which is screwed through hole 343 and meets hole 351 of narrow, clamping plate 350. Preferably, clamping screw 52 is ½-13×3 inches long, and the end of clamping screw 52 is adapted to receive a hex head wrench which is used to tighten the clamp.

Hole 343 is positioned off-center below hole 35 of first flange 32 of long "L" member 30. The bottom side of the projecting portion of narrow projecting surface 302 may be narrower than the width of first flange 32 of long "L" member 30. First flange of narrow short "L" member 340 is narrower than first flange 32 of long "L" member 30. As a result, hole 343 is positioned closer than hole 35 to the edge of narrow projecting surface 302.

The mount 90 is secured to a narrow projecting work surface 302 by clamping the surface 302 between "a" side 33 of first flange 32 of long "L" member 30 and the top surface of narrow clamping plate 350. In a preferred embodiment, the narrow clamping plate 350 is made of steel. Buffering pads (not shown) may be utilized similarly to the utilization of the buffering pads for the clamp mount 82. However, in this embodiment, the buffering pad for the narrow clamping plate 350 would be rectangular.

FIGS. 4, 5, 10A, 10B, and 12A through 12C show the mounting system of the present invention configured as a wall mount apparatus 80. Similar to the reverse wall mount apparatus 84 configuration, long "L" member 30 is secured by at least one wall screw 54 threaded through at least one threaded hole 38 in second flange 36, and into wall 4. Preferably, second flange 36 contains two threaded holes 38, arranged vertically to each other, and the long "L" member is secured by two wall screws 54. In a preferred embodiment, the wall screws 54 are made of wood, and they are secured to a stud in wall 4. Alternatively, any type of threaded cylindrical rod may be used in place of the at least one wall screw 54, provided the rod is of sufficient strength to hold the apparatus 80 to the wall 4.

Shaft holder 20 is secured to "a" side 33 of first flange 32 by screw 64 and nut 60. Preferably, screw 64 has dimensions of ⅜-16×⅞ inches long. It is also preferred that nut 60 is positioned in recess 29 in the bottom of shaft holder 20. FIGS. 8, 9, 11A and 11B show the mounting system of the present invention configured as a table or flat mount 86. Table mount 86 comprises shaft holder 20 which is secured to a projecting surface 2, which may be a table top, preferably by passing bolt 62 through hole 28, a hole in surface 2 and hole 51 of clamping plate 50 and securing the same with nut 60. Preferably the bolt 62 has a tapered hex head, and dimensions of ⅜-16×2 inches long. In this preferred embodiment, the bottom hole 28 is, recessed 29 for receiving the head of the bolt 62.

Preferably, the projecting surface 2 is at least one inch wide and no wider than the length of the bolt 62 with the nut 60 attached. A hole may be drilled in the surface 2 before passing the bolt 62 through the surface. Preferably, the drilled hole has a ⅜ inch diameter.

While the use of a clamping plate 50 is preferred, it may be omitted from the flat mount apparatus 86 configuration.

In other embodiments (not shown), at least one buffering pad may be placed between the bottom of the shaft holder 20 and the surface 2. In addition, the at least one buffering pad may be alternatively or additionally placed between the top of clamping plate 50 and the surface 2. Preferably, the buffering pad is shaped similarly to clamping plate 50, having a 2 inch diameter and including a center hole. The buffering pad can protect the surface from abrasion from the apparatus 86. In addition, the buffering pad can create a more secure contact between the apparatus 86 and the surface. While any non-abrasive material could be used to make the buffering pad, a preferred material is neoprene foam. Additionally, the buffering pad may contain an adhesive for adhering to the pad to the bottom of the shaft holder 20 or to the top of clamping plate 50.

Figure 14:
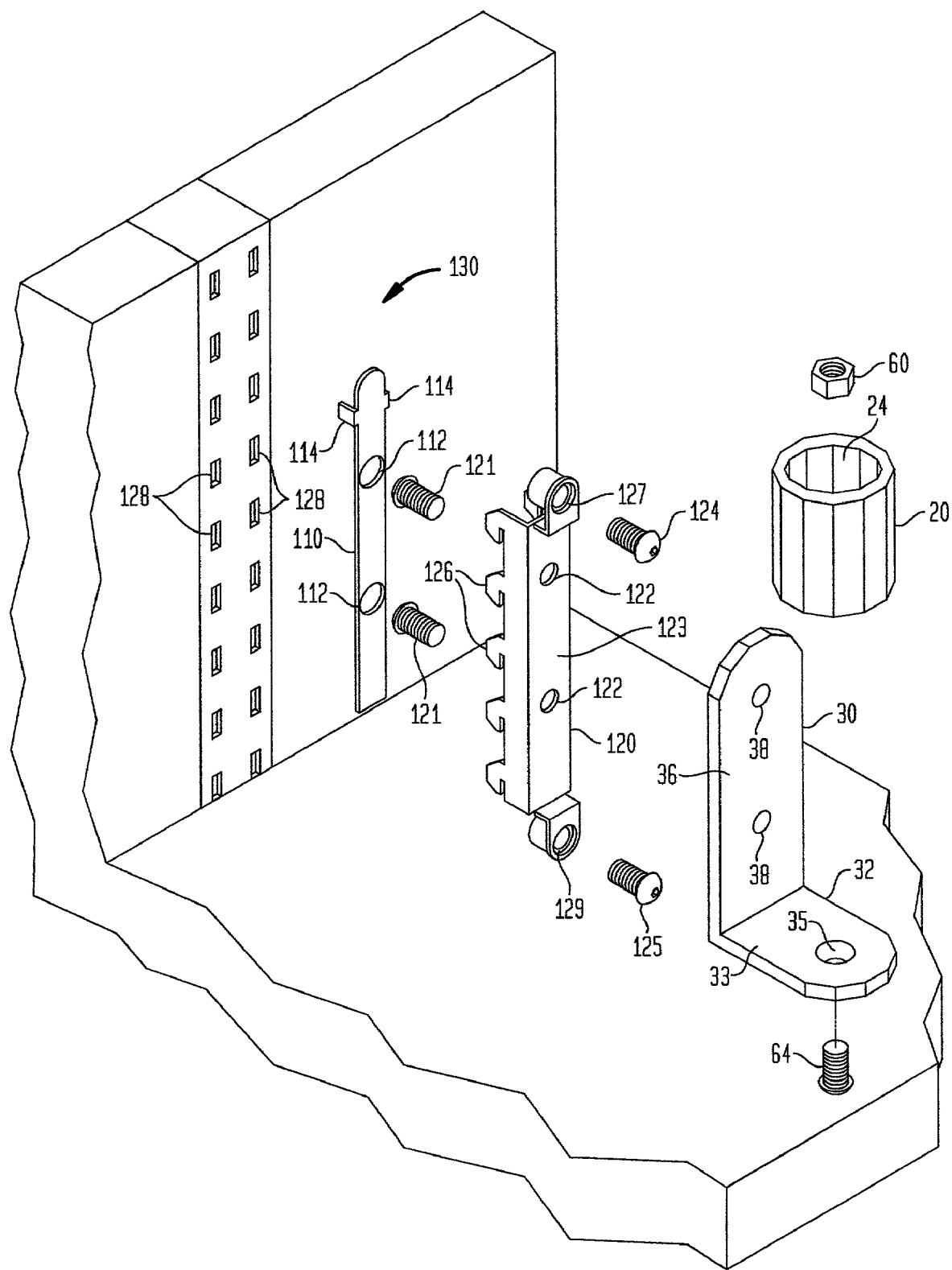
FIG. 14 is an exploded view of a mount configuration of the present invention with an adapter bracket to secure the mount to an office panel wall system.
Figure 15:
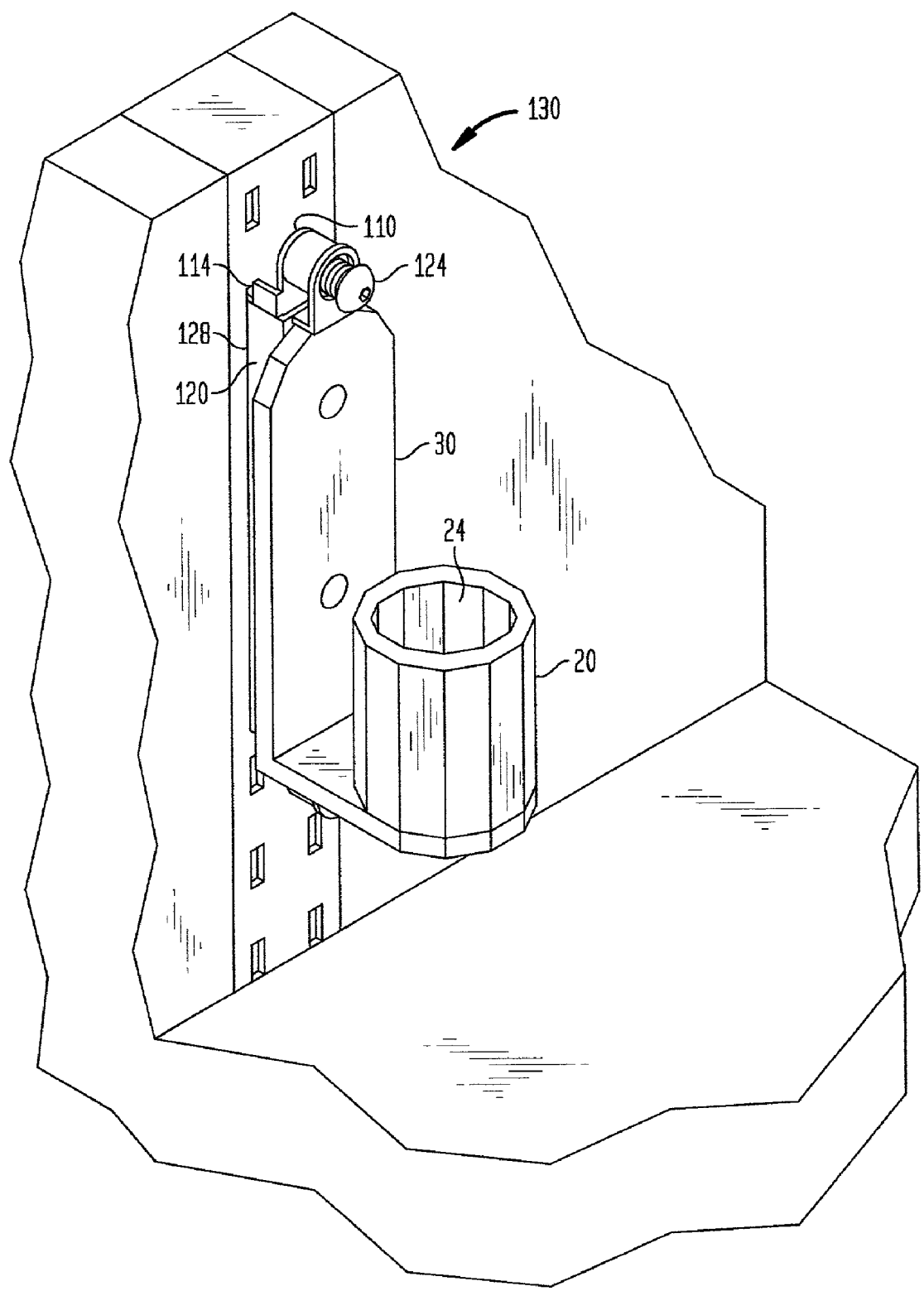
FIG. 15 is a perspective view of the panel wall mount configuration.

With reference to FIGS. 14 and 15, the mounting system of the present invention is configured as a panel wall mount apparatus. Typically, conventional panel wall systems have vertically aligned pairs of slots for receiving brackets and the like for securing shelves or table tops to the panel wall. The configurable mount of the present invention may be secured to the vertically aligned pairs of slots thereby permitting the arm apparatus to be secured directly to the panel wall 130. Second flange 36 of long "L" member 30 is attached to bracket 120 by at least one bolt 121 passing through at least one hole 122 on outward face 123 into at least one threaded hole 38 of second flange 36. Preferably, second flange 36 is attached to bracket 120 by two bolts 121 passing through two holes 122 on outward face 123 into two threaded holes 38 of second flange 36. Bracket 123 has a plurality of hooks 126 adapted to engage slots 128 in panel wall 130. Set screws or bolts 124 and 125 are threaded through holes 127 and 129 respectively and press against panel wall 130 to secure bracket 120 in a fixed manner. Preferably, threaded holes 127 and 129 for set screw or bolts 124 and 125 are positioned at the top and bottom of bracket 120. Preferably, plate 110 is positioned between panel wall 130 and set screws or bolts 124 and 125 to prevent damage to panel wall 130.

Optionally, plate 110 has tabs 114 for engaging a pair of slots 128 to assist in retaining plate 110 in the properly aligned position during assembly. Plate 110 may also have holes 112 to receive or permit at least one bolt 121 to pass through plate 110 in an unobstructed manner when bracket 120 is being secured to second flange 36 of long "L" member 30. Shaft holder 20 is secured to "a" side 33 of first flange 32 of long "L" member 30 as described above.

It is to be understood that any type of threaded cylindrical rod may be used in place of bolts 121 and set screws or bolts 124, 125 provided they are of sufficient strength for their intended purposes.

Figure 16:
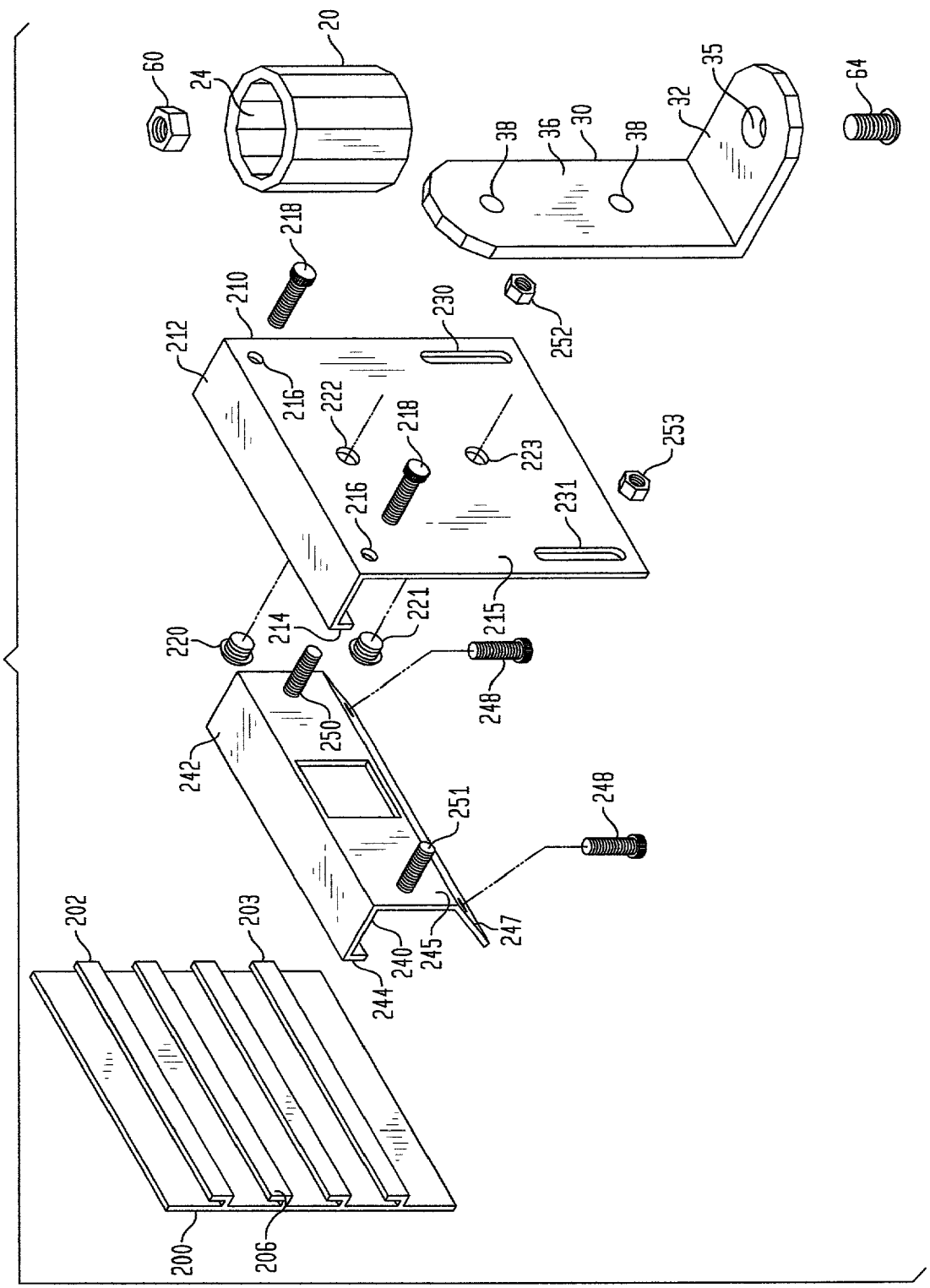
FIG. 16 is an exploded view of a mount configuration of the present invention with an adapter bracket arrangement to secure the mount to a slatwall having an upwardly facing slat.
Figure 17:
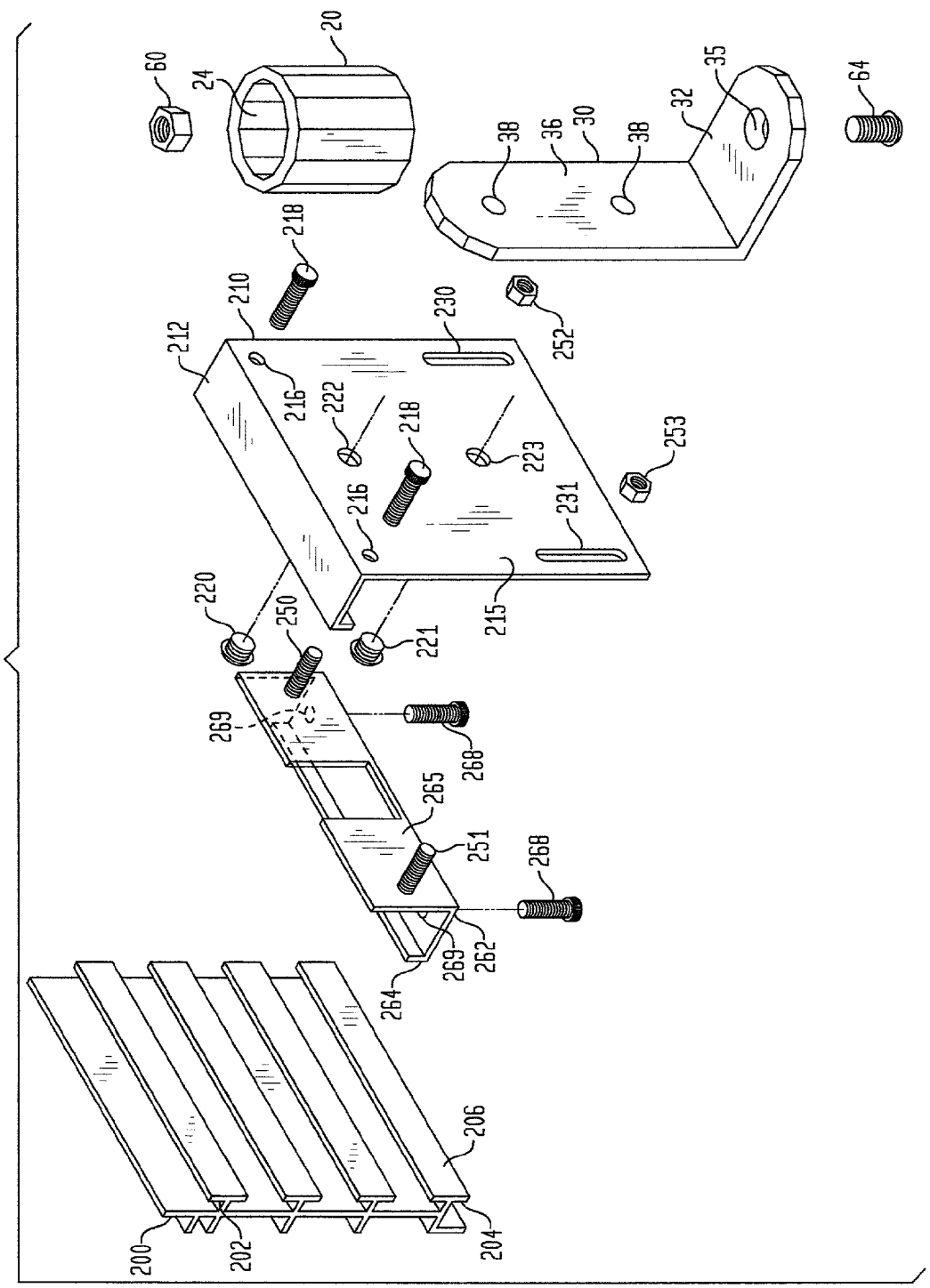
FIG. 17 is an exploded view of a mount configuration of the present invention with an adapter bracket arrangement to secure the mount to a slatwall having upwardly and downwardly facing slats.

FIGS. 16 and 17 show the mount of the present invention configured as a slat wall mount apparatus. FIG. 17 illustrates a configuration for mounting to a slatwall 200 having only upwardly facing slats. Second flange 36 of long "L" member 30 is attached to first bracket 210 by at least one bolt passing through at least one hole of face flange 215 into at least one threaded hole 38 of second flange 36. Preferably, second flange 36 is attached to first bracket 210 by bolts 220 and 221 passing through holes 222 and 223 respectively of face flange 215 into two threaded holes 38 of second flange 36. Lip 214 of top flange 212 is adapted to engage an upwardly facing slat 202 of slatwall 200. First bracket 210 is secured to the slat by set screws or bolts 218 threaded through holes 216 and tightened against face 206 of the slat.

A second bracket 240 has a top flange 242 with lip 244 to engage a lower upwardly facing slat 203. Second bracket 240 has a face flange 245 having a portion 247 thereof angled toward the slatwall 200 and is secured in position on lower slat 203 by set screws or bolts 248 which are threaded through portion 247 and press against the underside of lower slat 203. Second bracket 240 is secured to first bracket 210 by bolts 250 and 251 passing through holes in face flange 245 and slots 230 and 231, respectively, in face flange 215 and nuts 252 and 253. Shaft holder 20 is secured to "a" side 33 of first flange 32 of long "L" member 30 as described above.

It is to be understood that any type of threaded cylindrical rods may be used in place of bolts 220, 221, 250, 251 and set screws or bolts 218, 248 provided they are of sufficient strength for their intended purposes.

FIG. 17 illustrates a configuration of the mounting system of the present invention configured as an upwardly facing and downwardly facing slat wall mount apparatus. This apparatus is adapted for mounting to a slat wall 200 having upwardly and downwardly facing slats. First bracket 210 is secured to long "L" member 30 and the upwardly facing portion of slat 202 in the same manner as described above. In this configuration, a second bracket 260 has a lower flange 262 with lip 264 to engage the downwardly facing portion of slat 204. Second bracket 260 is secured in position on lower slat 204 by set screws or bolts 248 which are threaded through holes 269 through the bottom of lower flange 262 at an upward angle and press against the outer face 206 of lower slat 204. Second bracket 260 is secured to first bracket 210 by: bolts 250 and 251 passing through holes in face flange 245 and slots 230 and 231, respectively, in face flange 215 and nuts 252 and 253. Shaft holder 20 is secured to "a" side 33 of first flange 32 of long "L" member 30 as described above.

It is to be understood that any type of threaded cylindrical rods may be used in place of bolts 250, 251 and set screws or bolts 248 provided they are of sufficient strength for their intended purpose.

This invention includes a mounting system that incorporates all or some of the components above described in FIGS. 1 through 19. In conjunction with the components described in FIGS. 1 through 19, the system of the current invention also includes all or some of the configurations above described in relation to FIGS. 1 through 19.

In addition to the preferred embodiments previously described in detail, the shaft holder 20 may be attached to a horizontal, vertical or angled surface my attachment means (not shown) including glue, magnets, hook and loop material sold under the trademark VELCRO, tongue and groove assemblies, and the like.

The components of the mounting system may be fabricated using any suitable material such as aluminum, iron, steel other alloys as are well known in the art. Preferably, long "L" member 30, short "L" member 40, shaft holder 20 and clamping plate 50 are cast forged. Any suitable, durable plastic material may be used for "lightweight" applications. In a preferred embodiment, the nut 60 is fabricated from nylon.

Figure 3:
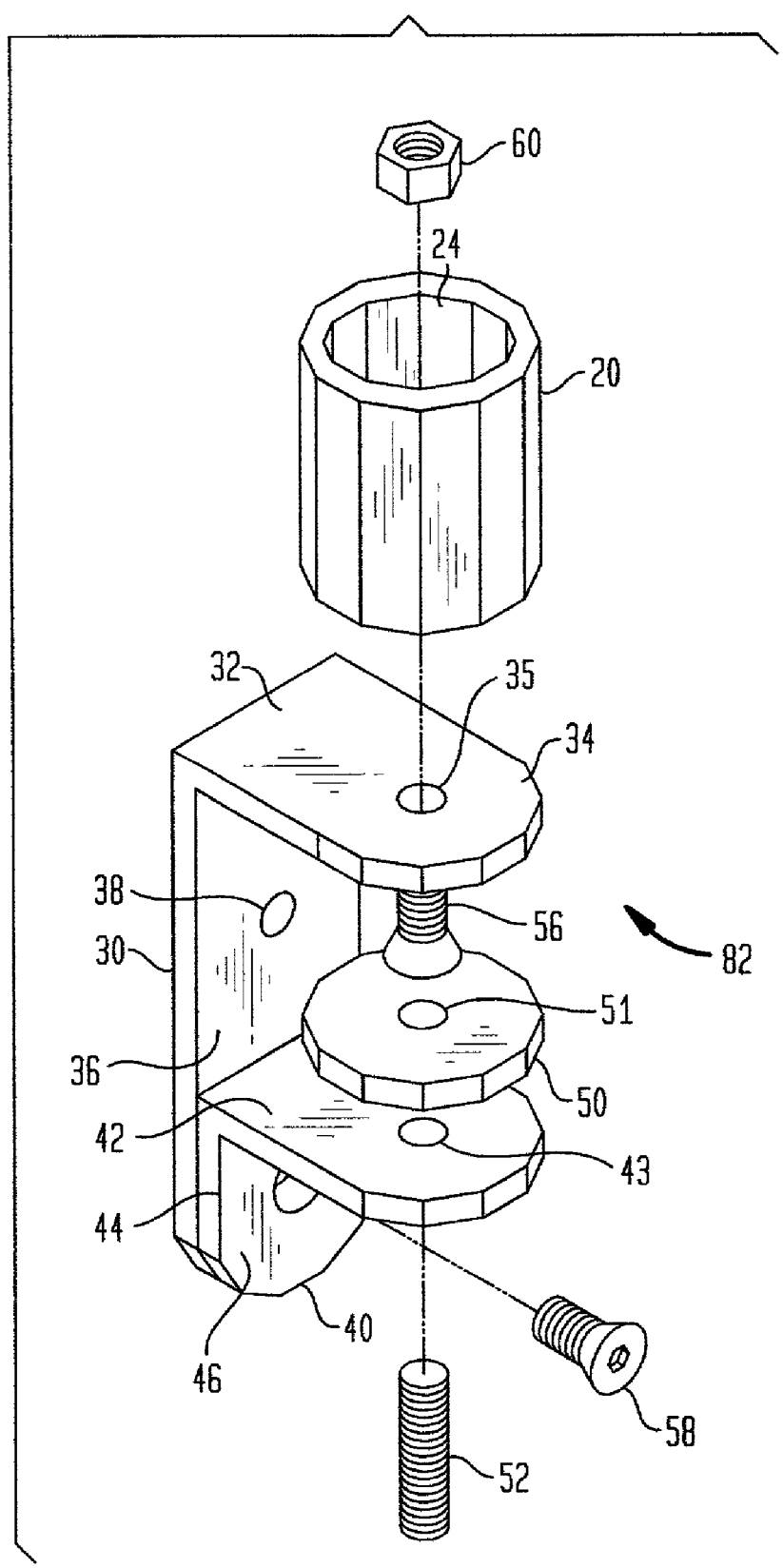
FIG. 3 is an exploded perspective view of a clamp configuration of the present invention.
Figure 4:
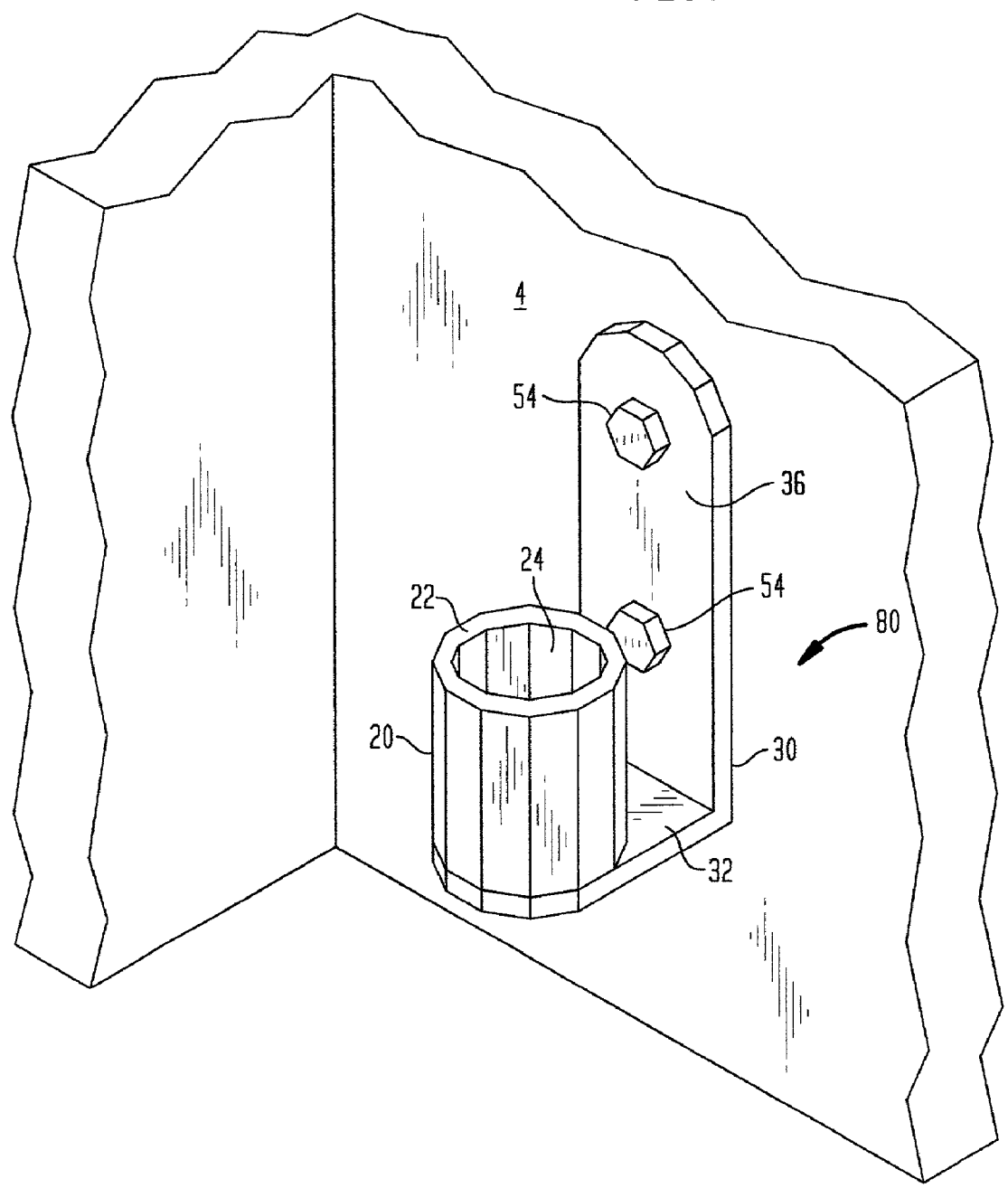
FIG. 4 is a perspective view of an apparatus according to the present invention in a wall mount configuration mounted to a wall.
Figure 5:
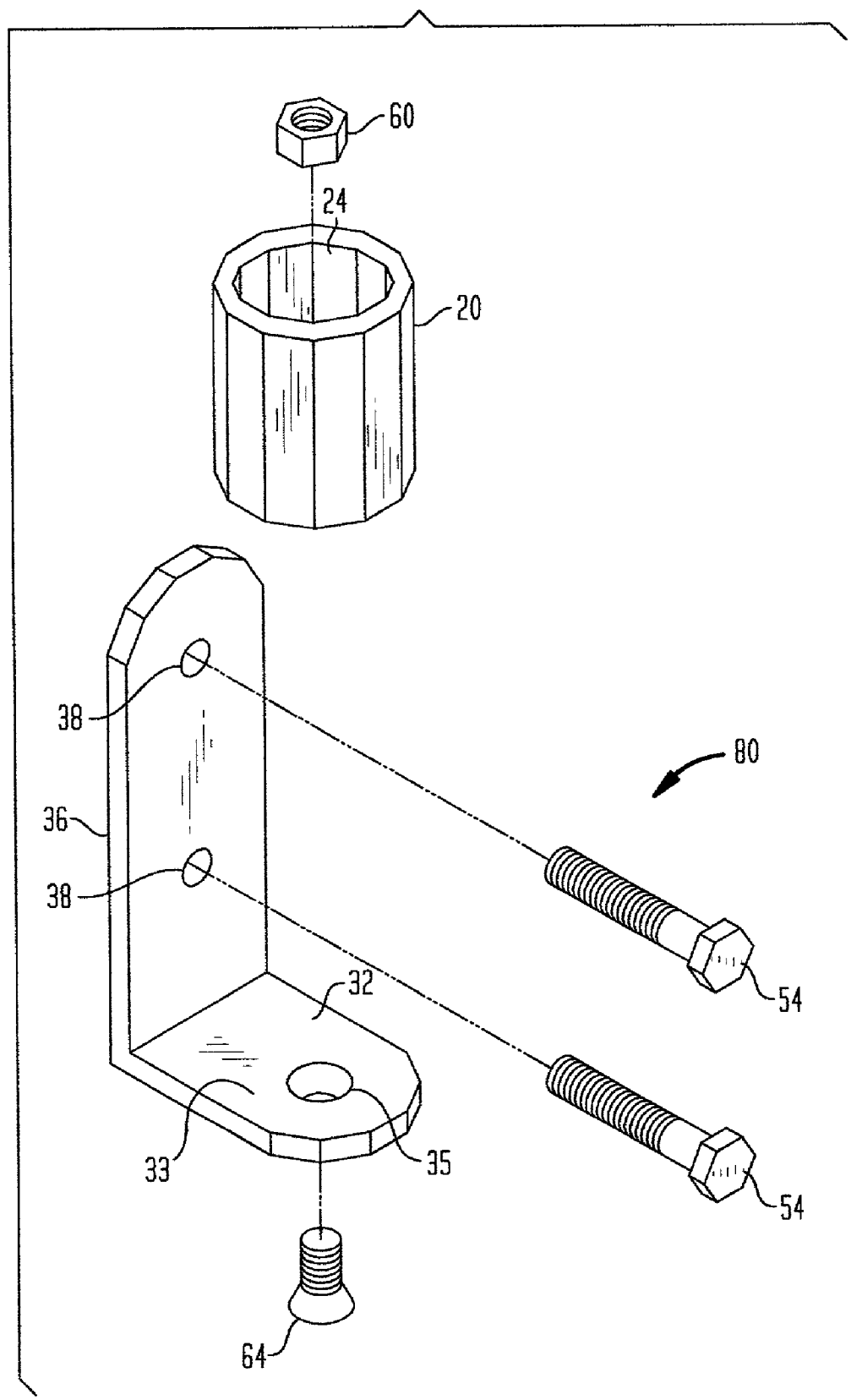
FIG. 5 is an exploded perspective view of a wall mount configuration of the present invention.
Figure 6:
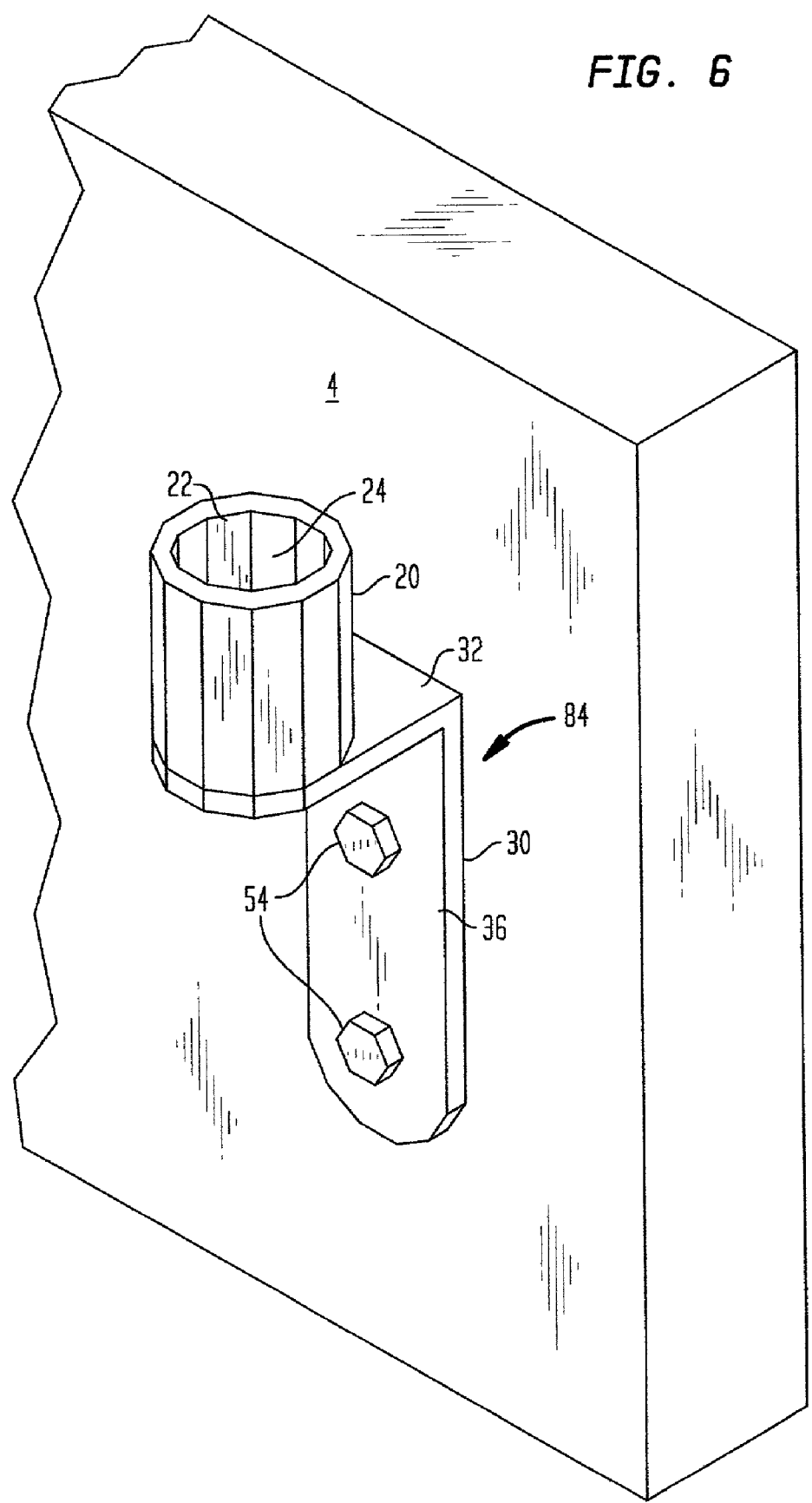
FIG. 6 is a perspective view of an apparatus according to the present invention in a reverse wall mount configuration mounted to a wall.
Figure 7:
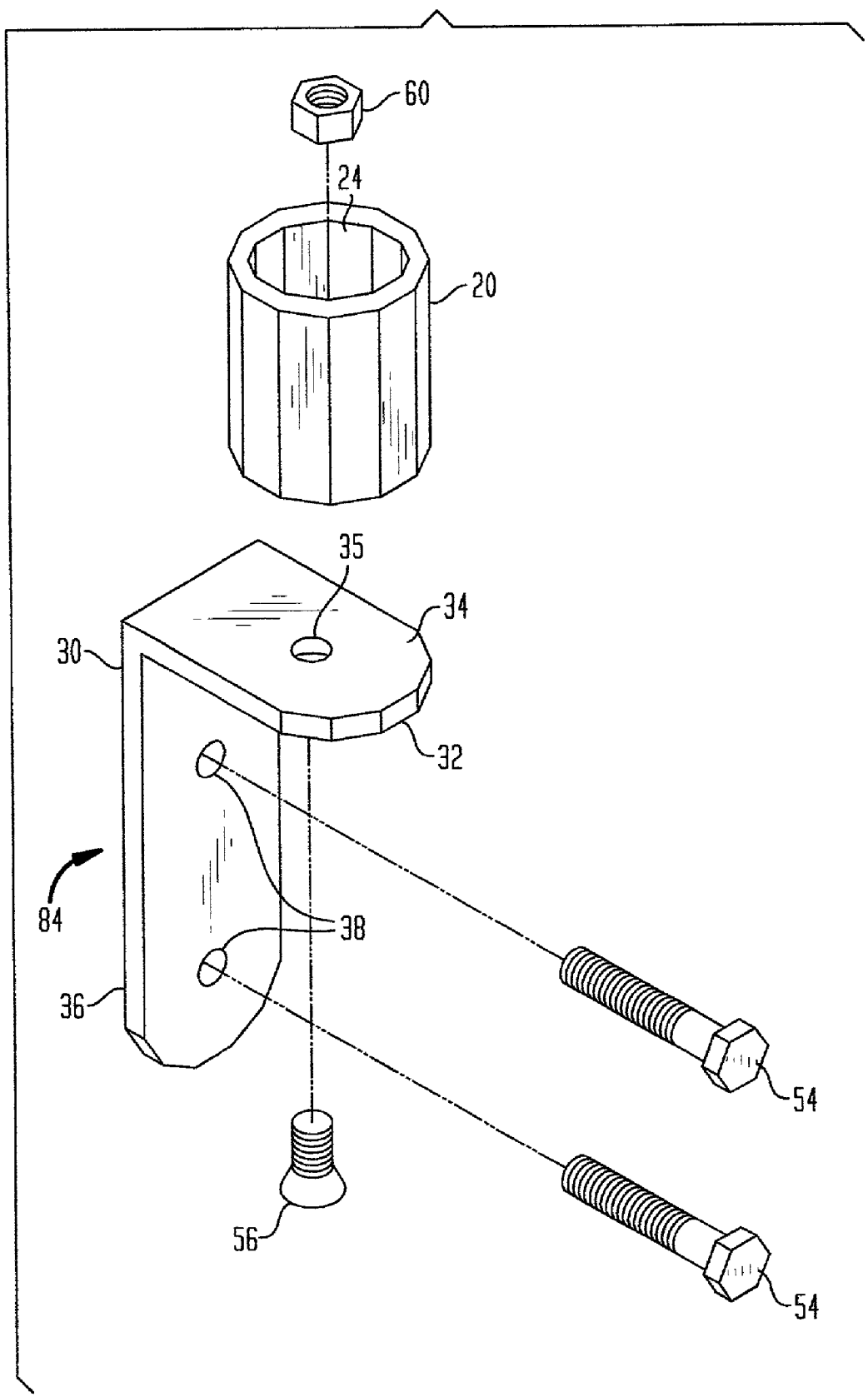
FIG. 7 is an exploded perspective view of a reverse wall mount configuration of the present invention.
Figure 20:
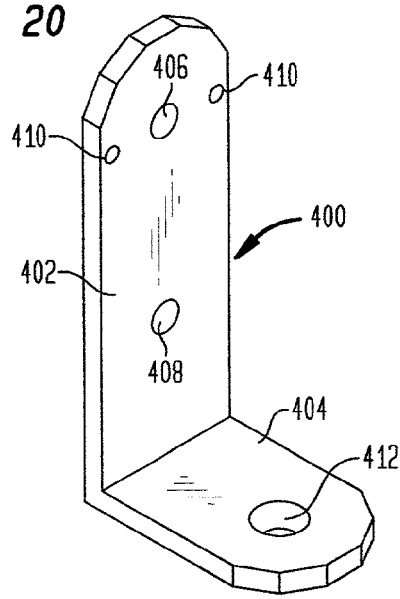
FIG. 20 is a perspective view of a first flange constructed in accordance with another embodiment of the present invention.

With reference to FIGS. 20–28, there will now be described variations in the embodiments of the present invention. Turning to FIG. 20, there is shown a first bracket 400 in the nature of a L-shaped member. The bracket includes a first flange 402 integrally connected perpendicularly to a second flange 404. The first flange 402 includes a pair of spaced apart through holes 406, 408 adjacent the upper and lower portions of the flange. The through holes 406, 408 may be threaded. At the upper end of the first flange 402, there is provided a pair of spaced apart openings or dimples 410 which, in one embodiment, are arranged on either side of through hole 406. The second flange 404 is provided with a through hole 412 having a chamfered opening, which may be threaded. Aside from openings 410, the first bracket 400 is similar in construction to the L-shaped member 30 as shown in FIG. 3.

Figure 21:
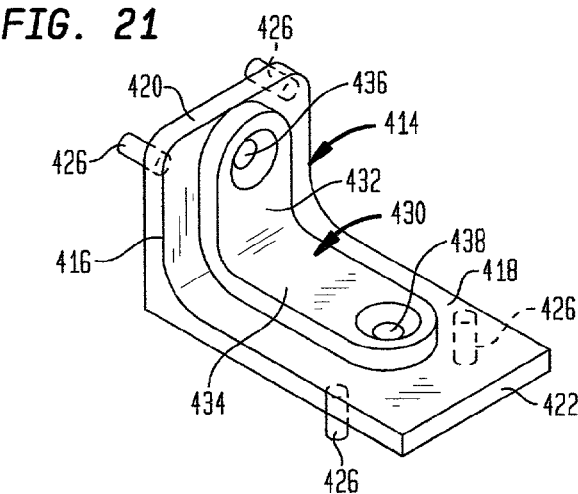
FIG. 21 is a perspective view of a second flange constructed in accordance with another embodiment of the present invention.
Figure 22:
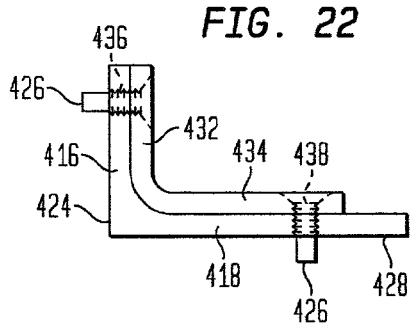
FIG. 22 is a side elevational view of the second flange shown in FIG. 21.

Turning to FIG. 21, there is shown a second bracket 414 in the nature of an L-shaped member having a first flange 416 integrally connected in perpendicular arrangement to a second flange 418. The first flange 416 has a generally straight end face 420 while the second flange 418 has a circular end face 422. As best shown in FIG. 22, the outer surface 424 of the first flange 416 supports a pair of spaced apart projecting pins 426. The pins 426 are dimensioned, shaped and spaced so as to align with openings 410 within the first flange 402 of the first bracket 400. Similarly, a pair of spaced apart projecting pins 426 are provided extending outwardly from the outer surface 428 of the second flange 418. Likewise, the pins 426 are aligned, shaped and sized so as to be received within the openings 410. An L-shaped boss 430 includes a pair of perpendicularly arranged legs 432, 434 in engagement with respective inner surfaces of the first and second flanges 416, 418. The boss 430 may be formed as a separate member which is welded to the second bracket 414. In the preferred embodiment, the boss 430 is formed integral with the second bracket 414 such as during molding, machining or other similar such manufacturing processes. The ends of the legs 432, 434 are provided with chamfered through holes 436, 438 which also extend through the first and second flanges 416, 418 of the second bracket 414, which holes are preferably threaded.

Figure 23:
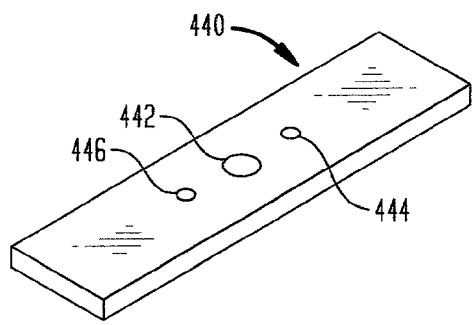
FIG. 23 is a perspective view of a clamp plate constructed in accordance with another embodiment of the present invention.

Turning to FIG. 23, there is shown a clamping bracket 440 in the nature of an elongated rectangular bar. Centrally positioned within the clamping bracket 440 is an opening or dimple 442, and two further spaced apart openings 444, 446 on either side of dimple 442. Openings 444, 446 are shaped, sized and spaced so as to receive the pins 426 which extend from the second bracket 414. It is to be understood that the openings 410, 444, 446 are not required to be through holes, but rather, may have a blind end. In this regard, the openings 410, 444, 446 are only required to be a depth generally sufficient to receive the extent of the projecting pins 426. In the preferred embodiment, the openings 410, 444, 446 are through holes.

Figure 24:
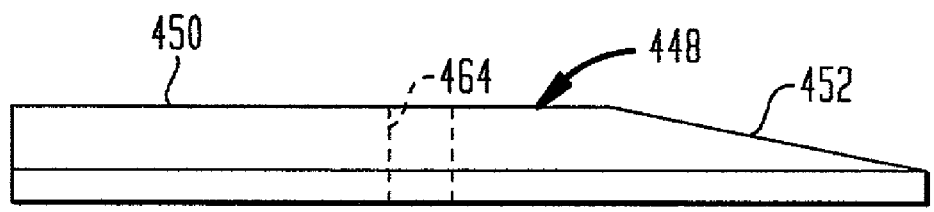
FIG. 24 is a side elevational view of a pressure plate constructed in accordance with the present invention.
Figure 25:
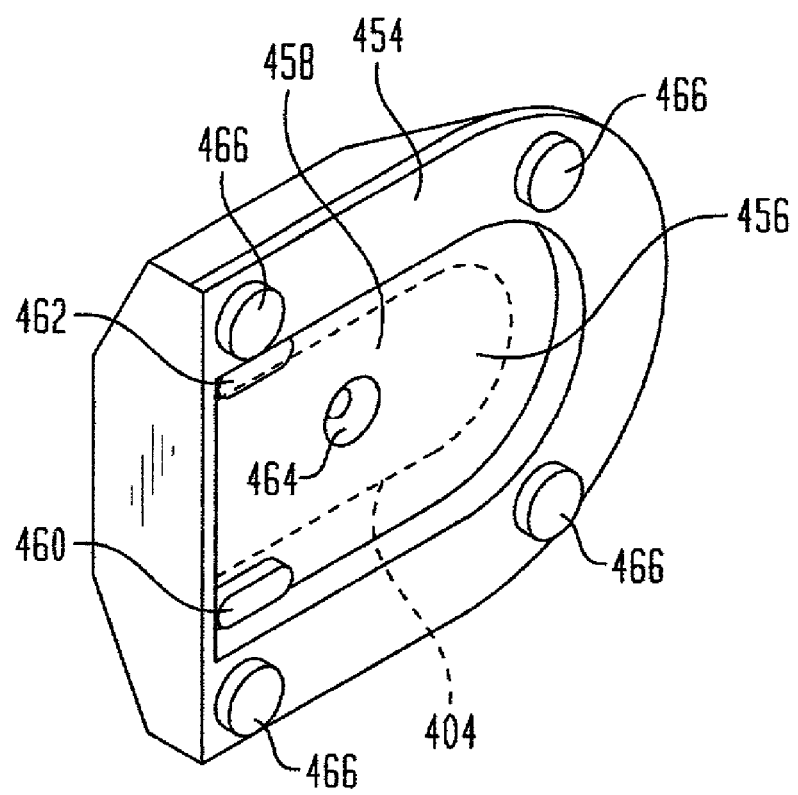
FIG. 25 is a bottom plan view of the pressure plate as shown in FIG. 24.

Referring to FIGS. 24 and 25, there is shown a pressure plate 448. The pressure plate 448 has an upper surface 450 provided with a tapered end 452. The lower surface 454 is provided with a central cavity 456 having dimensions larger than the second flange 404 of the first bracket 400. In this regard, the cavity 456 is sized so as to receive therein the second flange 404. The cavity 456 is provided with a bottom wall 458 from which there extends a pair of elongated projections 460, 462. The projections 460, 462 are spaced apart a sufficient distance to receive therebetween the second flange 404 of the first bracket 400 as shown in dashed lines. The pressure plate 448 is provided with a central through hole 464, which may be threaded, which is alignable with the through hole 412 within the second flange 404 of the first bracket 400. The lower surface 454 of the pressure plate 448 supports a plurality of resilient pads 466 which are spaced apart about the periphery of the pressure plate. One function of the pressure plate 448 is to create a larger surface area than the second flange 404 of the first bracket 400 to provide increased stability to the mounting apparatus.

Figure 8:
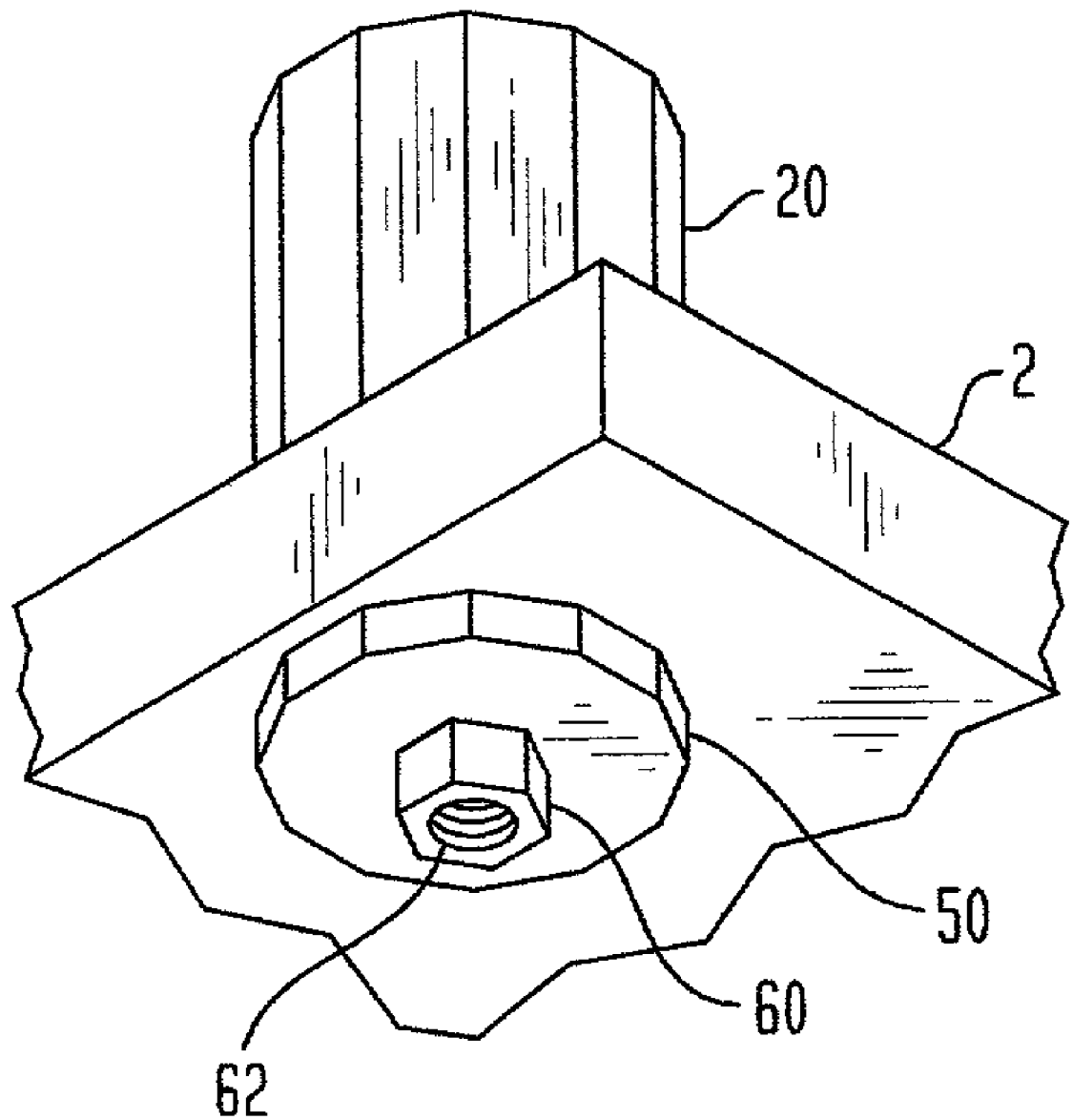
FIG. 8 is a perspective view of an apparatus according to the present invention in a table mount configuration mounted to a table top.
Figure 9:
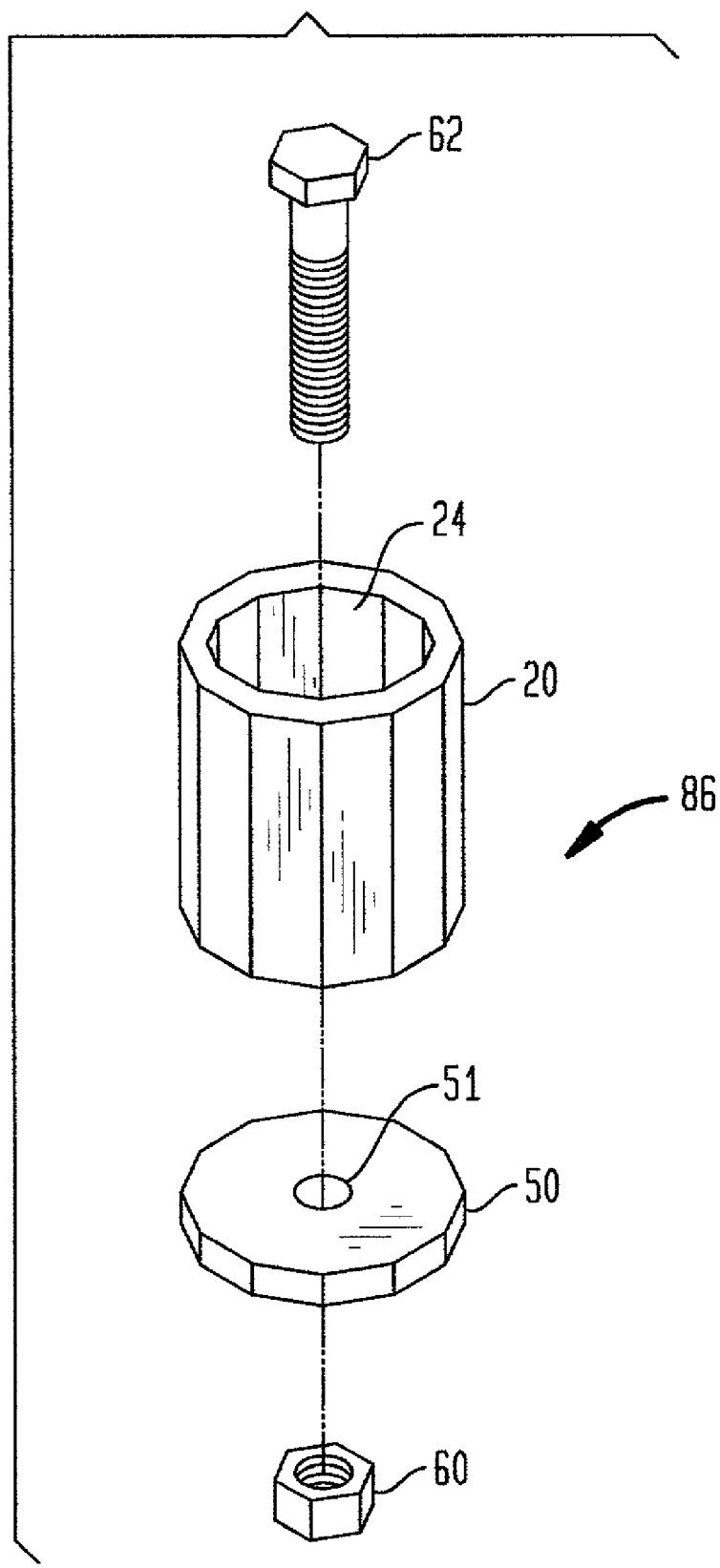
FIG. 9 is an exploded perspective view of a table mount configuration of the present invention.
Figure 10A:
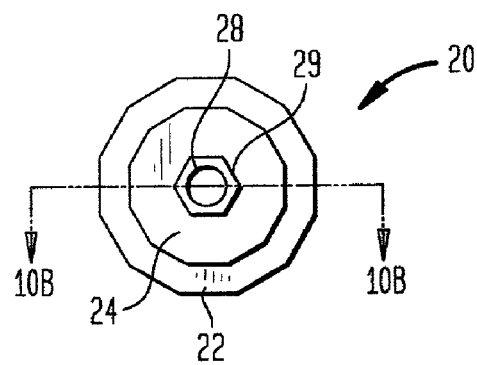
FIG. 10A is a top plan view of a shaft holder according to the present invention.
Figure 10B:
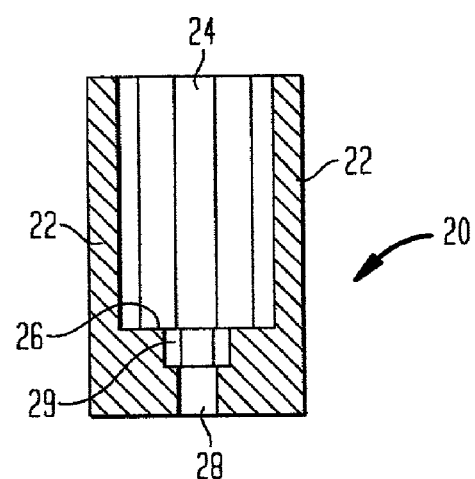
FIG. 10B is a cross-section side elevation view of the shaft holder shown in FIG. 10A along line 10B—10B.
Figure 11A:
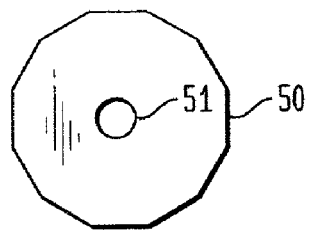
FIG. 11A is a top plan view of a clamping plate according to the present invention.
Figure 11B:
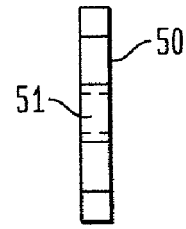
FIG. 11B is a side elevation view of the clamping plate shown in FIG. 11A.
Figure 12A:
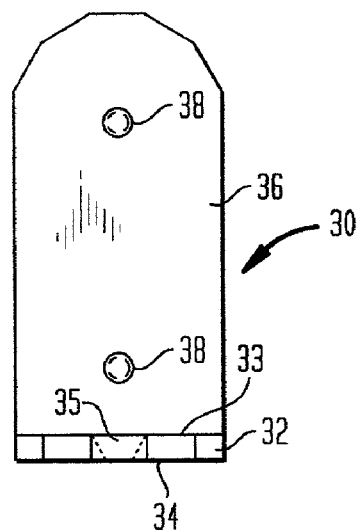
FIG. 12A is a front elevation view of a long "L" member according to the present invention.
Figure 12B:
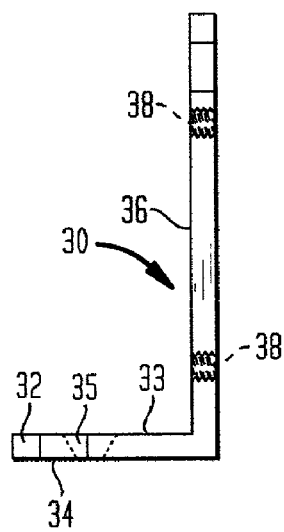
FIG. 12B is a side elevation of the long "L" member shown in FIG. 12A.
Figure 12C:
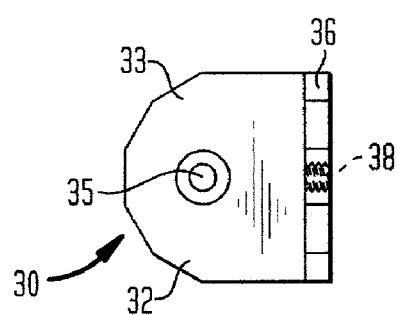
FIG. 12C is a top plan view of the long "L" member shown in FIG. 12A.
Figure 13A:
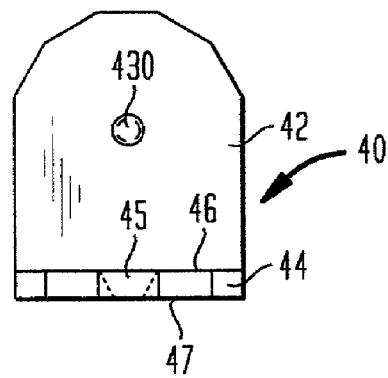
FIG. 13A is a front elevation view of a short "L" member according to the present invention.
Figure 13B:
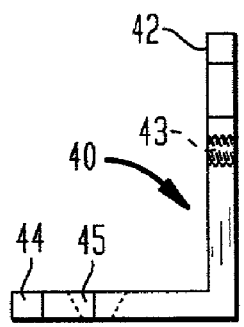
FIG. 13B is a side elevation of the short "L" member shown in FIG. 13A.
Figure 13C:
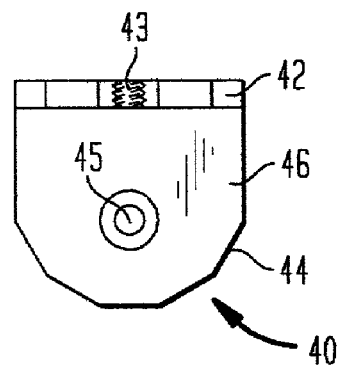
FIG. 13C is a top plan view of the short "L" member shown in FIG. 13A.
Figure 26:
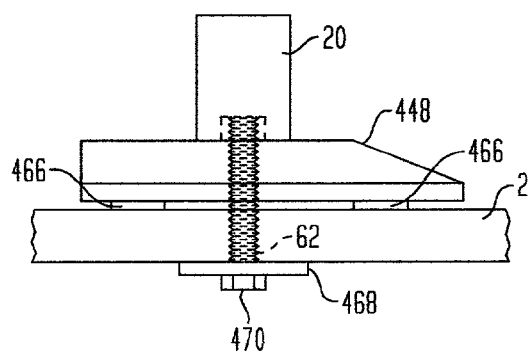
FIG. 26 is a side elevation of an apparatus according to the present invention incorporating a pressure plate arranged in accordance with one embodiment of the present invention.

In accordance with one embodiment as shown in FIG. 26, the pressure plate 448 is supported on surface 2 by the pads 466. A shaft holder 20 is positioned on the pressure plate 448 with through hole 464 arranged in alignment with the through hole in the shaft holder. In a manner as generally shown in FIGS. 8 and 9, a threaded bolt 62 extends perpendicularly through surface 2 through the shaft holder 20 and pressure plate 448. The threaded bolt has its free end extending through surface 2 so as to be engaged by a washer 468 or other clamping plate 50 and nut 470. In the embodiment as thus far described, the first and second brackets 400, 414 are not used in the mounting assembly.

Figure 27:
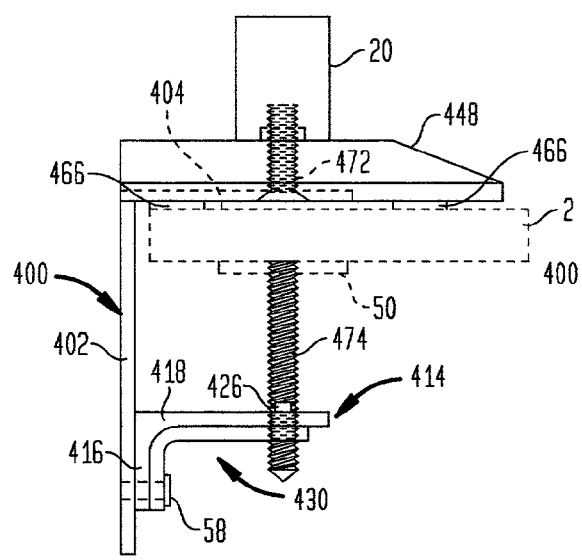
FIG. 27 is a side elevation of an apparatus assembled in accordance with one embodiment of the present invention.

Referring now to FIG. 27, the mounting assembly incorporates the first and second brackets 400, 414. As shown, the second flange 404 of the first bracket 400 is received within the cavity 456 of the pressure plate 448. The shaft holder 20 is secured to the pressure plate 448, and the second flange 404 to the pressure plate 448, by means of threaded bolt 472. The threaded bolt passes through the aligned through holes 412, 464 and through the bottom wall of the shaft holder 20. Accordingly, by virtue of bolt 472, the second flange 404 of the first bracket 400 is attached to the pressure plate 448, which in turn, is attached to shaft holder 20.

The second bracket 414 is arranged with the pins 426 which extend from the first flange 416 received within the openings 410 within the first flange 402 of the first bracket 400. The pins 426 prevent twisting of the second bracket 414 during the installation and tightening process. The second bracket 414 is attached to the first bracket 400 by means of a threaded bolt 58 such as shown in FIG. 3 which extends through through holes 436 and 406. In this regard, at least through hole 406 in the preferred embodiment will have a threaded portion, while through hole 436 may also be threaded. A threaded bolt 474 will be received through through hole 438 within the second bracket 414, which through hole will also preferably have a threaded portion. The free end of the bolt 474 can be engaged directly against the bottom of surface 2, or against a clamping plate 50. By rotation of the bolt 474, sufficient force will be applied to the mounting surface for securing the assembly thereto in the manner as previously described, for example, in the embodiment disclosed in FIG. 3. The pins 426 will prevent the rotation of the second bracket 414 which might otherwise occur as the bolt 474 applies pressure to the mounting surface. The pressure plate 448 will provide additional stability to the shaft holder 20 due to its extended peripheral area beyond the second flange 404 of the first bracket 400.

Figure 28:
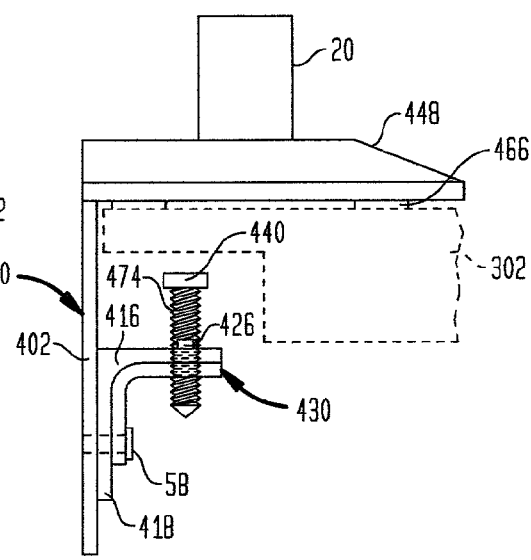
FIG. 28 is a side elevation of an apparatus assembled in accordance with another embodiment of the present invention.

Referring now to FIG. 28, there is illustrated another embodiment of the mounting assembly which is suitable for use with a support having a narrow edge as previously described with respect to the embodiment disclosed in FIG. 18. In this regard, the second bracket 414 is attached to the first bracket 400 by inserting the projecting pins 426 which extend from the second flange 418 into openings 410 provided within the first flange 402 of the first bracket 400. A threaded bolt 50 is used for securing the second bracket 414 to the first bracket 400. A threaded bolt 474 is received through the through hole 436 which preferably will include a threaded portion. The free end of the threaded bolt 474 will be captured within dimple 442 within the clamping bracket 440. The clamping bracket 440 will function as a pressure plate similar to that of clamping bracket 50. Here again, the pins 426 will prevent twisting or rotation of the second bracket 414 during installation of the mounting assembly. The openings 444, 446 in the clamping bracket 440 allow the clamping bracket to assume a lower position by receiving the pins 424 which extend from the first bracket 414. The ability to lower the clamping bracket 440 adjacent the surface of the second bracket 414 accommodates thicker mounting surfaces.

Figure 29:
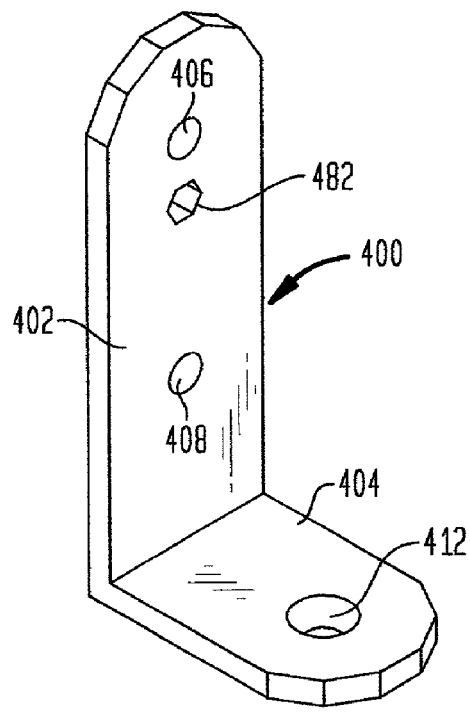
FIG. 29 is a perspective view of a first flange constructed in accordance with another embodiment of the present invention.
Figure 30:
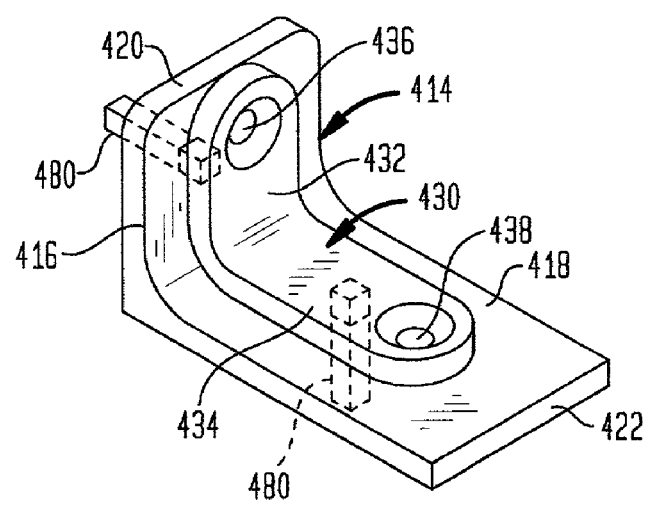
FIG. 30 is a perspective view of a second flange constructed in accordance with another embodiment of the present invention.

Referring to FIGS. 29 and 30, another embodiment of the present invention will now be described where like reference numerals represent like elements. Although the pins 426 have been shown as cylindrical, the pins may have any desired cross-sectional shape, for example, oval, square, triangular, rectangular, polygonal and the like. When the pins are constructed as non-circular bodies, only a single pin is required to prevent twisting of the second bracket 414. For example, a single polygonal shaped projecting pin 480 is provided on each of the first and second flanges 416, 418. As shown in FIG. 30, the longitudinal axes of the pins 480 are arranged transversely to each other. A correspondingly shaped opening 482 is provided in the first flange 402 of the first bracket 400. The pin 480 will mate with the opening 482, and based upon the non-circular shape of the pin and opening, the second bracket 414 will be precluded from rotation during installation. Accordingly, it can be appreciated that the configurable mount of the present invention may include a single pin of non-circular shape or multiple pins of any shape desired.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for mounting a device to a supporting surface, the apparatus comprising:
   a shaft holder including a bottom wall formed therein and an open top forming a receptacle therein for removably receiving the device;
   a first member having a first flange and a second flange perpendicularly attached to said first flange, said first flange attachable to said bottom wall of said shaft holder and said second flange having at least one opening therein; and
   a second member having a third flange and a fourth flange perpendicularly attached to said third flange, said third flange being shorter than said fourth flange, said third flange and said fourth flange each having an outer wall provided with at least one extending pin receivable within said at least one opening in said second flange when said third flange or said fourth flange is supported on said second flange, whereby said second member is prevented from twisting relative to said first member when said at least one extending pin is received within said at least one opening, said at least one extending pin having a non-circular shape when only one said pin is provided extending from said third and fourth flanges.

2. The apparatus of claim 1, wherein said opening and said pin are non-circular.

3. The apparatus of claim 1, wherein said at least one opening further includes a pair of openings within said second flange and a pair of extending pins on said outer wall of said third flange receivable within said openings within said second flange.

4. The apparatus of claim 1, wherein said fourth flange of said second member includes a pair of pins extending from said outer wall.

5. The apparatus of claim 1, wherein said second member includes an L-shaped boss attached to an adjacent inner surface of said third flange and said fourth flange.

6. The apparatus of claim 1, wherein said second flange of said first member includes a first opening and said third flange and said fourth flange of said second member include respective second and third openings, said second opening alignable with said first opening when said third flange is supported on said second flange and said third opening alignable with said first opening when said fourth flange is supported on said second flange.

7. The apparatus of claim 3, further including a clamping plate having a pair of spaced openings alignable to receive said pins extending from said third flange.

8. The apparatus of claim 1, further including a pressure plate attachable between said first flange of said first member and the bottom wall of said shaft holder.

9. The apparatus of claim 8, wherein said first flange of said first member has a first surface area and said pressure plate has a second surface area greater than said first surface area.

10. The apparatus of claim 8, wherein said pressure plate includes a bottom surface and a plurality of resilient support members thereon.

11. The apparatus of claim 3, wherein said second member includes an L-shaped boss attached to an adjacent inner surface of said third flange and said fourth flange, said boss Including a first hole extending through said boss and said third flange and a second hole extending through said boss and said fourth flange, said first and second holes having axes arranged perpendicular to each other, and a third hole within said second flange.

12. The apparatus of claim 11, further including a threaded member for attaching said third flange of said second member to said second flange of said first member upon said threaded member being received within said first and third holes and for attaching said fourth flange of said second member to said second flange of said first member upon said threaded member being received within said second and third holes.

13. The apparatus of claim 1, wherein said shaft holder is attached to said first flange of said first member by a threaded member.

14. The apparatus of claim 1, further including a pressure plate attachable between said first flange of said first member and the bottom wall of said shaft holder, said pressure plate including a bottom cavity constructed to receive therein said first flange of said first member.

15. The apparatus of claim 14, further including a pair of spaced projecting pins within said cavity, said first flange receivable between said projecting pins when positioned within said cavity.

16. The apparatus of claim 1, further including a threaded rod threadably received through one of said third and fourth flanges of said second member, said rod having a free end opposing said first flange of said first member.

17. An apparatus for mounting an arm device to a supporting surface, the apparatus comprising:
   a shaft holder including a bottom wall formed therein and an open top forming a receptacle therein for receiving the arm device;
   a first member having a first flange and a second flange perpendicularly attached to said first flange, said first flange attachable to said bottom wall of said shaft holder and said second flange having a pair of spaced openings therein; and
   a second member having a third flange and a fourth flange perpendicularly attached to said third flange, said third flange being shorter than said fourth flange, said third flange having an outer wall provided with a pair of extending pins receivable within said openings in said second flange when said third flange is supported on said second flange and said fourth flange having an outer wall provided with another pair of extending pins receivable within said openings in said second flange when said fourth flange is supported on said second flange, said second flange of said first member including a first opening and said third flange and said fourth flange of said second member include respective second and third openings, said second opening alignable with said first opening when said third flange is supported on said second flange and said third opening alignable with said first opening when said fourth flange is supported on said second flange, whereby said second member is prevented from twisting relative to said first member when either one of said pair of extending pins or said another pair of extending pins is received within said pair of spaced apart openings in said second flange.

18. The apparatus of claim 17, wherein said second member includes an L-shaped boss attached to an adjacent inner surface of said third flange and said fourth flange, said boss including a first hole extending through said boss and said third flange and a second hole extending through said boss and said fourth flange, said first and second holes having axes arranged perpendicular to each other, and a third hole within said second flange.

19. The apparatus of claim 18, further including a threaded member for attaching said third flange of said second member to said second flange of said first member upon being received within said first and third holes and for attaching said fourth flange of said second member to said second flange of said first member upon being received within said second and third holes.

20. The apparatus of claim 17, wherein said shaft holder is attached to said first flange of said first member by a threaded member.

21. The apparatus of claim 17, further including a pressure plate attachable between said first flange of said first member and the bottom wall of said shaft holder, said pressure plate including a bottom cavity constructed to receive therein said first flange of said first member.

22. The apparatus of claim 21, further including a pair of spaced pins within said cavity, said first flange receivable between said pair of spaced pins when positioned within said cavity.

23. The apparatus of claim 17, further including a threaded rod threadably received through one of said third and fourth flanges of said second member, said rod having a free end opposing said first flange of said first member.

24. A method of mounting an apparatus for a device to a supporting surface, said method comprising:
providing a first member having a first flange and a second flange perpendicularly attached to said first flange, said second flange having at least one opening therein;
attaching a shaft holder to said first flange for mounting a device thereto;
providing a second member having a third flange and a fourth flange perpendicularly attached to said third flange, said third flange being shorter than said fourth flange, said third flange and said fourth flange each having an outer wall and at least one pin extending therefrom, said at least one extending pin having a non-circular shape when only one said pin is provided extending from said third and fourth flanges;
preventing twisting of said second member relative to said first member by inserting one of said pins into said opening with said third flange abutting said second flange or inserting the other of said pins into said opening with said fourth flange abutting said second flange, said first and fourth flanges forming an opening therebetween;
securing said second and third flanges together; and
securing a supporting surface within said opening formed between said first and fourth flanges.

25. The method of claim 24, further including inserting a threaded rod extending perpendicular through said fourth flange, said rod having a free end opposing said first flange.

26. The method of claim 25, further including supporting a clamping plate on the free end of said rod and engaging said supporting surface with said clamping plate by rotation of said rod.

27. The method of claim 24, further including attaching a pressure plate between said first flange and said shaft holder.

28. The method of claim 24, further including attaching an arm device for mounting an electronic device to said shaft holder.

29. The method of claim 24, further including providing a pair of said pins extending from an outer wall of said fourth flange of said second member.

30. The method of claim 29, further including providing said second flange with a pair of spaced openings and said third flange having said outer wall with a pair of said pins extending therefrom.

31. The method of claim 30, wherein said pair of pins extending from said fourth flange are alignable with said pair of spaced openings.

32. The method of claim 24, wherein said pin and said opening are non-circular.

33. A method of assembling an apparatus for attaching a device to a supporting surface, said method comprising:
providing a first member having a first flange and a second flange perpendicularly attached to said first flange, said second flange having a pair of spaced openings therein;
attaching a shaft holder to said first flange for mounting a device thereto;
providing a second member having a third flange and a fourth flange perpendicularly attached to said third flange, said third flange being shorter than said fourth flange, said third flange having an outer wall and a first pair of pins extending therefrom, said fourth flange having an outer wall and a second pair of pins extending therefrom;
preventing twisting of said second member relative to said first member by inserting either said first pair of pins into said pair of spaced openings with said third flange abutting said second flange or said second pair of pins into said pair of spaced openings with said fourth flange abutting said second flange; and
securing the abutting flanges together.

34. The method of claim 33, wherein said first and fourth flanges form an opening therebetween for receiving a supporting surface.

35. The method of claim 33, wherein said first and third flanges form an opening therebetween for receiving a supporting surface.

36. The method of claim 33, wherein one of said pins is non-circular.

37. An apparatus for mounting a device to a supporting surface, the apparatus comprising:
an assembly including a first member having a first flange and a second flange perpendicularly attached to said first flange, said second flange having at least one opening therein, and a second member having a third flange and a fourth flange perpendicularly attached to said third flange, said third flange being shorter than said fourth flange, said third flange having an outer wall provided with at least one extending pin receivable within said at least one opening in said second flange when said third flange is supported on said second flange, said fourth flange having an outer wall provided with at least one extending pin receivable within said at least one opening in said second flange when said fourth flange is supported on said second flange, whereby said second member is prevented from twisting relative to said first member when said at least one extending pin is received within said at least one opening, said at least one extending pin having a non-circular shape when only one said pin is provided extending from said third and fourth flanges; and
a shaft holder attached to said assembly, said shaft holder having an opening forming a receptacle therein for removably receiving the device.

38. The apparatus of claim 37, wherein said opening and said pin are non-circular.

39. The apparatus of claim 37, wherein said at least one opening further includes a pair of openings within said second flange and a pair of extending pins on said outer wall of said third flange receivable within said openings within said second flange.

40. A method of assembling an apparatus for attaching a device to a supporting surface, said method comprising:
providing a first member having a first flange and a second flange perpendicularly attached to said first flange, said second flange having at least one opening therein;
providing a second member having a third flange and a fourth flange perpendicularly attached to said third flange, said third flange being shorter than said fourth flange, said third flange and said fourth flange each having an outer wall and at least one pin extending therefrom, said at least one extending pin having a non-circular shape when only one said pin is provided extending from said third and fourth flanges;
preventing twisting of said second member relative to said first member by inserting one of said pins into said opening with said third flange abutting said second flange or inserting the other of said pins into said opening with said fourth flange abutting said second flange, securing said first member to said second member thereby forming an assembly, whereby said second member is prevented from twisting relative to said first member; and
attaching a shaft holder to said assembly for mounting a device thereto.

41. The method of claim 40, further including providing said second flange with a pair of spaced openings and said third flange having said outer wall with a pair of said pins extending therefrom.

42. The method of claim 41, further including providing a pair of pins extending from an outer wall of said fourth flange of said member.

43. The method of claim 42, wherein said pair of pins extending from said fourth flange are alignable with said pair of spaced openings.

44. The method of claim 40, wherein said pin and said opening are non-circular.

45. An apparatus for mounting a device to a supporting surface, the apparatus comprising:
a shaft holder including a bottom wall formed therein and an open top forming a receptacle therein for removably receiving the device;
a first member having a first flange and a second flange perpendicularly attached to said first flange, said first flange attachable to said bottom wall of said shaft holder and said second flange having at least one opening therein; and
a second member having a third flange and a fourth flange perpendicularly attached to said third flange, said third flange having an outer wall provided with at least one extending pin receivable within said at least one opening in said second flange when said third flange is supported on said second flange, said second member including an L-shaped boss attached to an adjacent inner surface of said third flange and said fourth flange, whereby said second member is prevented from twisting relative to said first member when said at least one extending pin is received within said at least one opening.

46. An apparatus for mounting a device to a supporting surface, the apparatus comprising:
a shaft holder including a bottom wall formed therein and an open top forming a receptacle therein for removably receiving the device;
a first member having a first flange and a second flange perpendicularly attached to said first flange, said first flange attachable to said bottom wall of said shaft holder and said second flange having at least one opening therein;
a pressure plate attachable between said first flange of said first member and the bottom wall of said shaft holder; and
a second member having a third flange and a fourth flange perpendicularly attached to said third flange, said third flange having an outer wall provided with at least one extending pin receivable within said at least one opening in said second flange when said third flange is supported on said second flange, whereby said second member is prevented from twisting relative to said first member when said at least one extending pin is received within said at least one opening.

47. An apparatus for mounting an arm device to a supporting surface, the apparatus comprising:
a shaft holder including a bottom wall formed therein and an open top forming a receptacle therein for receiving the arm device;
a first member having a first flange and a second flange perpendicularly attached to said first flange, said first flange attachable to said bottom wall of said shaft holder and said second flange having a pair of spaced openings therein;
a second member having a third flange and a fourth flange perpendicularly attached to said third flange, said third flange having an outer wall provided with a pair of extending pins receivable within said openings in said second flange when said third flange is supported on said second flange and said fourth flange having an outer wall provided with another pair of extending pins receivable within said openings in said second flange when said fourth flange is supported on said second flange, said second flange of said first member including a first opening and said third flange and said fourth flange of said second member include respective second and third openings, said second opening alignable with said first opening when said third flange is supported on said second flange and said third opening alignable with said first opening when said fourth flange is supported on said second flange, whereby said second member is prevented from twisting relative to said first member when either one of said pair of extending pins or said another pair of extending pins is received within said pair of spaced apart openings in said second flange; and
wherein said second member includes an L-shaped boss attached to an adjacent inner surface of said third flange and said fourth flange, said boss including a first hole extending through said boss and said third flange and a second hole extending through said boss and said fourth flange, said first and second holes having axes arranged perpendicular to each other, and a third hole within said second flange.

48. An apparatus for mounting an arm device to a supporting surface, the apparatus comprising:
a shaft holder including a bottom wall formed therein and an open top forming a receptacle therein for receiving the arm device;
a first member having a first flange and a second flange perpendicularly attached to said first flange, said first flange attachable to said bottom wall of said shaft holder and said second flange having a pair of spaced openings therein;
a pressure plate attachable between said first flange of said first member and the bottom wall of said shaft holder, said pressure plate including a bottom cavity constructed to receive therein said first flange of said first member; and a second member having a third flange and a fourth flange perpendicularly attached to said third flange, said third flange having an outer wall provided with a pair of extending pins receivable within said openings in said second flange when said third flange is supported on said second flange and said fourth flange having an outer wall provided with another pair of extending pins receivable within said openings in said second flange when said fourth flange is supported on said second flange, said second flange of said first member including a first opening and said third flange and said fourth flange of said second member include respective second and third openings, said second opening alignable with said first opening when said third flange is supported on said second flange and said third opening alignable with said first opening when said fourth flange is supported on said second flange, whereby said second member is prevented from twisting relative to said first member when either one of said pair of extending pins or said another pair of extending pins is received within said pair of spaced apart openings in said second flange.

49. A method of mounting an apparatus for a device to a supporting surface, said method comprising:

providing a first member having a first flange and a second flange perpendicularly attached to said first flange, said second flange having at least one opening therein;

attaching a shaft holder to said first flange for mounting a device thereto;

attaching a pressure plate between said first flange and said shaft holder;

providing a second member having a third flange and a fourth flange perpendicularly attached to said third flange, said third flange having an outer wall and at least one pin extending therefrom;

preventing twisting of said second member relative to said first member by inserting said pin into said opening with said third flange abutting said second flange, said first and fourth flanges forming an opening therebetween;

securing said second and third flanges together; and securing a supporting surface within said opening formed between said first and fourth flanges.

* * * * *

UNITED STATES PATENT AND TRADEMARK OFFICE
CERTIFICATE OF CORRECTION

PATENT NO. : 6,986,489 B2  Page 1 of 1
DATED : January 17, 2006
INVENTOR(S) : Odd N. Oddsen, Jr.

It is certified that error appears in the above-identified patent and that said Letters Patent is hereby corrected as shown below:

<u>Title page,</u>
Item [57], ABSTRACT,
Line 3, after "to create a clamp mount", insert -- for the adjustable arm. -- and delete ", a wall mount, a reverse wall mount, or table or flat mount, a panel mount and a slat mount.".

<u>Column 13,</u>
Line 63, "Including" should read -- including --.

Signed and Sealed this

Sixth Day of June, 2006

JON W. DUDAS
*Director of the United States Patent and Trademark Office*